United States Patent
Nicks et al.

(10) Patent No.: US 8,706,728 B2
(45) Date of Patent: Apr. 22, 2014

(54) CALCULATING RELIABILITY SCORES FROM WORD SPLITTING

(75) Inventors: Paul Nicks, Marion, IA (US); Doug Schmucker, Hiawatha, IA (US); Jeff Belina, Marion, IA (US); Gregory Glick, Cedar Falls, IA (US); Patrick Lutwitze, Cedar Rapids, IA (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 350 days.

(21) Appl. No.: 12/894,558

(22) Filed: Sep. 30, 2010

(65) Prior Publication Data

US 2011/0208723 A1  Aug. 25, 2011

Related U.S. Application Data

(63) Continuation-in-part of application No. 12/708,752, filed on Feb. 19, 2010, and a continuation-in-part of application No. 12/708,775, filed on Feb. 19, 2010, and a continuation-in-part of application No. 12/708,793, filed on Feb. 19, 2010, and a continuation-in-part of application No. 12/708,809, filed on Feb. 19, 2010.

(51) Int. Cl.
*G06F 7/06* (2006.01)
*G06F 7/02* (2006.01)

(52) U.S. Cl.
USPC ........................................ 707/736; 707/748

(58) Field of Classification Search
None
See application file for complete search history.

(56) References Cited

U.S. PATENT DOCUMENTS

| | | | |
|---|---|---|---|
| 6,151,631 A | 11/2000 | Ansell et al. | |
| 6,298,341 B1 | 10/2001 | Mann et al. | |
| 6,332,158 B1 | 12/2001 | Risley et al. | |
| 6,334,132 B1 * | 12/2001 | Weeks | 707/723 |
| 6,446,133 B1 | 9/2002 | Tan et al. | |
| 6,480,508 B1 | 11/2002 | Mwikalo et al. | |
| 6,480,837 B1 | 11/2002 | Dutta | |
| 6,519,589 B2 | 2/2003 | Mann et al. | |
| 6,560,634 B1 | 5/2003 | Broadhurst | |
| 6,687,746 B1 | 2/2004 | Shuster et al. | |
| 6,745,248 B1 | 6/2004 | Gardos et al. | |
| 6,876,997 B1 | 4/2005 | Rorex et al. | |
| 6,880,007 B1 | 4/2005 | Gardos et al. | |
| 6,895,430 B1 | 5/2005 | Schneider | |

(Continued)

FOREIGN PATENT DOCUMENTS

WO   WO2005017762   2/2005

OTHER PUBLICATIONS

Unpublished U.S. Appl. No. 12/708,752.
Unpublished U.S. Appl. No. 12/708,775.

(Continued)

*Primary Examiner* — Ajay Bhatia
*Assistant Examiner* — Miranda Huang
(74) *Attorney, Agent, or Firm* — Chris A. Watt

(57) ABSTRACT

Systems and methods of the present invention provide for the word splitting and reliability score for an entered character string. A list of keywords may be extracted from the character string entered into a user interface on a client. These keywords may be compared to potential matches in a dictionary database and a reliability score for word splits and keywords strings may be compiled and displayed to the user. The client may also display the reliability score using a plurality of logical groupings within a reliability score process.

20 Claims, 14 Drawing Sheets

(56) References Cited

U.S. PATENT DOCUMENTS

| | | | |
|---|---|---|---|
| 6,901,436 | B1 | 5/2005 | Schneider |
| 6,976,090 | B2 | 12/2005 | Ben-Shaul et al. |
| 7,188,138 | B1 | 3/2007 | Schneider |
| 7,467,140 | B2 | 12/2008 | Monroe |
| 7,472,160 | B2 | 12/2008 | King et al. |
| 7,523,310 | B2 | 4/2009 | Narin et al. |
| 7,565,630 | B1 | 7/2009 | Kamvar et al. |
| 7,606,858 | B2 | 10/2009 | King et al. |
| 7,664,831 | B2 | 2/2010 | Cartmell et al. |
| 7,689,458 | B2 | 3/2010 | Heckerman et al. |
| 7,711,850 | B2 | 5/2010 | Ronen et al. |
| 7,711,851 | B2 | 5/2010 | Ronen et al. |
| 7,788,130 | B2 | 8/2010 | Feeley et al. |
| 7,805,379 | B1 | 9/2010 | Adkins, III et al. |
| 8,015,006 | B2 * | 9/2011 | Kennewick et al. .......... 704/236 |
| 8,117,339 | B2 | 2/2012 | Adelman et al. |
| 2002/0010795 | A1 | 1/2002 | Brown |
| 2002/0065903 | A1 | 5/2002 | Fellman |
| 2002/0091703 | A1 | 7/2002 | Bayles |
| 2002/0091827 | A1 | 7/2002 | King et al. |
| 2002/0178383 | A1 | 11/2002 | Hrabik et al. |
| 2002/0194373 | A1 | 12/2002 | Choudhry |
| 2003/0149690 | A1 | 8/2003 | Kudlacik et al. |
| 2004/0064561 | A1 | 4/2004 | Parsons et al. |
| 2004/0083306 | A1 | 4/2004 | Gloe |
| 2004/0093331 | A1 * | 5/2004 | Garner et al. ..................... 707/3 |
| 2004/0199493 | A1 | 10/2004 | Ruiz et al. |
| 2004/0199520 | A1 | 10/2004 | Ruiz et al. |
| 2005/0055299 | A1 | 3/2005 | Chambers et al. |
| 2005/0125451 | A1 | 6/2005 | Mooney |
| 2005/0165904 | A1 | 7/2005 | Mooney |
| 2005/0172031 | A1 | 8/2005 | Adelman |
| 2005/0273344 | A1 | 12/2005 | Lee et al. |
| 2005/0289242 | A1 | 12/2005 | Ruiz |
| 2006/0004784 | A1 | 1/2006 | Ableman |
| 2006/0011720 | A1 | 1/2006 | Call |
| 2006/0031315 | A1 | 2/2006 | Fenton et al. |
| 2006/0101113 | A1 | 5/2006 | Lemson et al. |
| 2006/0101155 | A1 | 5/2006 | Damour et al. |
| 2006/0122889 | A1 | 6/2006 | Burdick et al. |
| 2006/0161682 | A1 | 7/2006 | King et al. |
| 2006/0271668 | A1 | 11/2006 | Parsons et al. |
| 2006/0287936 | A1 | 12/2006 | Jacobson |
| 2007/0067465 | A1 | 3/2007 | Blinn et al. |
| 2007/0083652 | A1 | 4/2007 | King et al. |
| 2007/0299682 | A1 | 12/2007 | Roth et al. |
| 2007/0299815 | A1 | 12/2007 | Starbuck et al. |
| 2008/0005312 | A1 | 1/2008 | Boss et al. |
| 2008/0027809 | A1 | 1/2008 | Storm |
| 2008/0034211 | A1 | 2/2008 | Shull et al. |
| 2008/0059348 | A1 | 3/2008 | Glassman et al. |
| 2008/0065974 | A1 | 3/2008 | Campbell |
| 2008/0126232 | A1 | 5/2008 | Lee |
| 2008/0201487 | A1 | 8/2008 | Blinn et al. |
| 2008/0222125 | A1 | 9/2008 | Chowdhury |
| 2008/0229430 | A1 | 9/2008 | Kargman |
| 2008/0235383 | A1 | 9/2008 | Schneider |
| 2008/0313229 | A1 | 12/2008 | Taswell |
| 2009/0119198 | A1 | 5/2009 | Manriquez et al. |
| 2009/0248625 | A1 | 10/2009 | Adelman et al. |
| 2009/0248734 | A1 | 10/2009 | Adelman et al. |
| 2009/0248735 | A1 | 10/2009 | Adelman et al. |
| 2009/0248736 | A1 | 10/2009 | Adelman et al. |
| 2009/0254572 | A1 * | 10/2009 | Redlich et al. ................ 707/10 |
| 2010/0114879 | A1 | 5/2010 | Zhong et al. |
| 2010/0145678 | A1 * | 6/2010 | Csomai et al. ..................... 704/9 |
| 2012/0047577 | A1 | 2/2012 | Costinsky |

OTHER PUBLICATIONS

Unpublished U.S. Appl. No. 12/708,793.
Unpublished U.S. Appl. No. 12/708,809.
Unpublished U.S. Appl. No. 12/894,519.
Unpublished U.S. Appl. No. 12/894,558.
Apr. 15, 2013 Notice of Allowance in related U.S. Appl. No. 12/708,809.
Domain Appraisal, Mar. 3, 2009, pp. 1-7.
LeapFish Free Domain Name Appraisal: Find Domain Worth, May 19th, 2006, pp. 1-4.
Morgan, Do You Really Understand Domain Value? Aug. 16, 2009, pp. 1-7.
Pixelrage, The Only Domain Name Appraisal Guide You'll Ever Need, Sep. 15, 2008, pp. 1-6.
High Value Domain Yard, Apr. 3, 2009, pp. 1-5.
Chef Patrick, What Makes a Premium Domain Name, Oct. 1, 2008, pp. 1-4.
Douglas, Why the Live Domain Auction Bombed (and Why I'm Not Surprised)—Domain Name Wire, Comment 21, Feb. 4, 2009, pp. 1-7.
kevinfrost, Domain Name Investing: The Easiest Way to Make Money Online?, Apr. 12, 2010, pp. 1-7.
EstiBot.com User's Guide, Feb. 4, 2010, pp. 1-22.
Nameboy Ultimate Domain Name Generator, search, creation, domain name lookup and domain registration, Oct. 22, 2008 pp. 1-2.
Ohman, Watch Me Hand Register Keyword.com Domains Worth More than $100, Feb. 21, 2009, pp. 1-5.
Information retrieval—Wikipedia, the free encyclopedia, Nov. 10, 2009, pp. 1-8.
Oct. 23, 2012 Office Action in related U.S. Appl. No. 12/708,793.
Oct. 25, 2012 Office Action in related U.S. Appl. No. 12/708,752.
Oct. 26, 2012 Office Action in related U.S. Appl. No. 12/708,809.
Laidlaw, What's Your Web Site Worth, May 7, 2008, pp. 1-22.
Domain Name Appraisal FAQ, Feb. 26, 2009, pp. 1-2.
Jan. 23, 2013 response to Oct. 26, 2012 office action in related patent U.S. Appl. No. 12/708,809.
Jan. 31, 2013 office action in related U.S. Appl. No. 12/708,809.
Jan. 23, 2013 response to Oct. 23, 2012 office action in related U.S. Appl. No. 12/708,793.
Jan. 31, 2013 office action in related U.S. Appl. No. 12/708,793.
Mar. 7, 2013 office action in related U.S. Appl. No. 12/894,519.
Mar. 21, 2013 response to Jan. 31, 2013 office action in related U.S. Appl. No. 12/708,809.
Mar. 21, 2013 response to Jan. 31, 2013 office action in related U.S. Appl. No. 12/708,793.
Jun. 7, 2013 response to Mar. 7, 2013 office action in related U.S. Appl. No. 12/894,519.
Dnxpert, Fusu Domain Stock Exchange in Beta, http://www.dnxpert.com/2007/10/18/fusu-domain-stock-exchange-in-beta/.
Mockapetris, RFC 1035, Domain Names—Implementation and Specification, Nov. 1, 1987.
Moffat, RSS—A Primer for Publishers & Content Proivders, p. 3, Aug. 20, 2003.
Internet print-out of http://web.archive.org/web/20000901042248/http://www.datex.net/ecommerce/glossary.htm, Internet archive of datex.net, Sep. 1, 2000.
Business EditorslHigh Tech Writers "Network Solutions Affiliate Program to Offer Expanded Internet Identity Services Through Storefront", Business Wire, May 11, 2000, p. 1.
"Domain name Hijacking: Incidents, Threats, Risks, and Remedial Actions", A Report from the ICANN Security and Stability Advisory Committee, pp. 1-48, Jul. 2005.
Keywords—the Most Important Item in SEO, Mar. 23, 2007, pp. 1-4.
Van Couvering, DomainsBot Investigation#2, Jan. 22, 2006, pp. 1-6.
Jun. 25, 2013 Notice of Allowance in related U.S. Appl. No. 12/894,519.

* cited by examiner

CALCULATING RELIABILITY SCORES FROM WORD SPLITTING

CROSS REFERENCE TO RELATED PATENT APPLICATIONS

This patent application is a continuation-in-part of the following previously-filed patent applications:

U.S. patent application Ser. No. 12/708,752, to Paul Nicks, with a filing date Feb. 19, 2010 and titled "SEMANTIC DOMAIN NAME SPINNING."

U.S. patent application Ser. No. 12/708,775, to Paul Nicks, with a filing date Feb. 19, 2010 and titled "AUTOMATED SEMANTIC DOMAIN SPINNING TOOLS."

U.S. patent application Ser. No. 12/708,793, to Paul Nicks, with a filing date Feb. 19, 2010 and titled "APPRAISING DOMAIN NAMES USING COMPARATIVE DATA."

U.S. patent application Ser. No. 12/708,809, to Paul Nicks, with a filing date Feb. 19, 2010 and titled "DOMAIN APPRAISAL ALGORITHM."

This patent application is related to the following concurrently-filed patent applications:

U.S. patent application Ser. No. 12/894,519, "SPLITTING A CHARACTER STRING INTO KEYWORD STRINGS."

The subject matter of all patent applications is commonly owned and assigned to Go Daddy Operating Company, LLC. All prior applications are incorporated herein in their entirety by reference

FIELD OF THE INVENTION

The present inventions generally relate to the field of domain names and specifically to the field of semantic domain name spinning and domain appraisal.

SUMMARY OF THE INVENTION

The present invention provides methods and systems for word splitting based on a word splitting character string input. An exemplary method may comprise several steps including the step of receiving a word splitting input as a character string via an interface on a client operated by a user of the system. The system may then create a cached micro-dictionary from the character string comprising a plurality of micro-dictionary words. A loop count may be established from the plurality of micro-dictionary words, and the loop count may be used to begin each pass through a micro-dictionary loop with a different micro-dictionary word as the first to be used.

For each pass through the micro-dictionary loop, and while characters remain in the character string, 3 steps may be repeated: First, a largest contiguous word may be found in the character string. The largest contiguous word may be removed from the character string and the largest contiguous word in a keyword list may be stored. Reliability scores for multiple keyword strings may be calculated, the keyword strings containing words from the keyword list, which were derived from the character string, and the keyword strings and reliability scores may be displayed on the client computer.

The present invention also provides methods and systems for an automated calculation and display of one or more reliability scores and keyword strings derived from an input character string, using a reliability score process algorithm. The calculation of these reliability scores may be accomplished by breaking the reliability of the keyword strings into five logical groupings, possibly including evaluation of 5 reliability variables related to the domain name. The plurality of keywords derived from each of one or more word splits may be compared with a plurality of dictionary words in a dictionary database to determine a percentage of the plurality of keywords found in the dictionary database. For each of the one or more word splits, a percentage of characters in a plurality of keywords found in the dictionary database may be determined. The uniqueness of each of the one or more word splits may be scored, and each of the one or more word splits may be ranked based on how many of the plurality of keywords were derived from each of the one or more word splits. The one or more word splits and reliability scores may then be displayed on an interface on a client computer.

The above features and advantages of the present invention will be better understood from the following detailed description taken in conjunction with the accompanying drawings.

DETAILED DESCRIPTION

Figure 1:
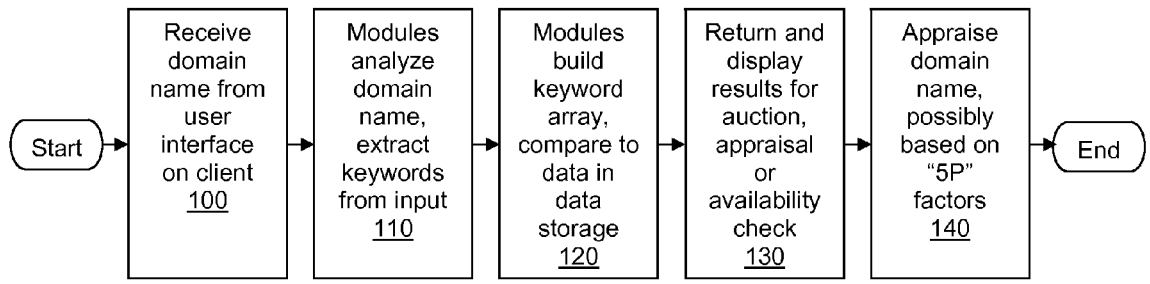
FIG. 1 is a flow diagram illustrating a possible embodiment of a method for semantic domain name spinning.

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers place multimedia information (e.g., text, graphics, audio, video, animation, and other forms of data) at specific locations on the Internet referred to as websites. The combination of all the websites and their corresponding web pages on the Internet is generally known as the World Wide Web (WWW) or simply the Web.

For Internet users and businesses alike, the Internet continues to be increasingly valuable. More people use the Web for everyday tasks, from social networking, shopping, banking, and paying bills to consuming media and entertainment. E-commerce is growing, with businesses delivering more services and content across the Internet, communicating and collaborating online, and inventing new ways to connect with each other.

Prevalent on the Web are multimedia websites, some of which may offer and sell goods and services to individuals and organizations. Websites may consist of a single webpage, but typically consist of multiple interconnected and related web pages. Websites, unless extremely large and complex or have unusual traffic demands, typically reside on a single server and are prepared and maintained by a single individual or entity. Menus and links may be used to move between different web pages within the website or to move to a different website as is known in the art. The interconnectivity of web pages enabled by the Internet can make it difficult for Internet users to tell where one website ends and another begins.

Websites may be created using HyperText Markup Language (HTML) to generate a standard set of tags that define how the web pages for the website are to be displayed. Users of the Internet may access content providers' websites using software known as an Internet browser, such as MICROSOFT INTERNET EXPLORER or MOZILLA FIREFOX. After the browser has located the desired webpage, it requests and receives information from the webpage, typically in the form of an HTML document, and then displays the webpage content for the user. The user then may view other web pages at the same website or move to an entirely different website using the browser.

Some Internet users, typically those that are larger and more sophisticated, may provide their own hardware, software, and connections to the Internet. But many Internet users either do not have the resources available or do not want to create and maintain the infrastructure necessary to host their own websites. To assist such individuals (or entities), hosting companies exist that offer website hosting services. These hosting providers typically provide the hardware, software, and electronic communication means necessary to connect multiple websites to the Internet. A single hosting provider may literally host thousands of websites on one or more hosting servers.

Browsers are able to locate specific websites because each website, resource, and computer on the Internet has a unique Internet Protocol (IP) address. Presently, there are two standards for IP addresses. The older IP address standard, often called IP Version 4 (IPv4), is a 32-bit binary number, which is typically shown in dotted decimal notation, where four 8-bit bytes are separated by a dot from each other (e.g., 64.202.167.32). The notation is used to improve human readability. The newer IP address standard, often called IP Version 6 (IPv6) or Next Generation Internet Protocol (IPng), is a 128-bit binary number. The standard human readable notation for IPv6 addresses presents the address as eight 16-bit hexadecimal words, each separated by a colon (e.g., 2EDC:BA98:0332:0000:CF8A:000C:2154:7313).

IP addresses, however, even in human readable notation, are difficult for people to remember and use. A Uniform Resource Locator (URL) is much easier to remember and may be used to point to any computer, directory, or file on the Internet. A browser is able to access a website on the Internet through the use of a URL. The URL may include a Hypertext Transfer Protocol (HTTP) request combined with the website's Internet address, also known as the website's domain name. An example of a URL with a HTTP request and domain name is: http://www.companyname.com. In this example, the "http" identifies the URL as a HTTP request and the "companyname.com" is the domain name.

Domain names are much easier to remember and use than their corresponding IP addresses. The Internet Corporation for Assigned Names and Numbers (ICANN) approves some Generic Top-Level Domains (gTLD) and delegates the responsibility to a particular organization (a "registry") for maintaining an authoritative source for the registered domain names within a TLD and their corresponding IP addresses. For certain TLDs (e.g., .biz, .info, .name, and .org) the registry is also the authoritative source for contact information related to the domain name and is referred to as a "thick" registry. For other TLDs (e.g., .com and .net) only the domain name, registrar identification, and name server information is stored within the registry, and a registrar is the authoritative source for the contact information related to the domain name. Such registries are referred to as "thin" registries. Most gTLDs are organized through a central domain name Shared Registration System (SRS) based on their TLD.

The process for registering a domain name with .com, .net, .org, and some other TLDs allows an Internet user to use an ICANN-accredited registrar to register their domain name. For example, if an Internet user, John Doe, wishes to register the domain name "mycompany.com," John Doe may initially determine whether the desired domain name is available by contacting a domain name registrar. The Internet user may make this contact using the registrar's webpage and typing the desired domain name into a field on the registrar's webpage created for this purpose. Upon receiving the request from the Internet user, the registrar may ascertain whether "mycompany.com" has already been registered by checking the SRS database associated with the TLD of the domain name. The results of the search then may be displayed on the webpage to thereby notify the Internet user of the availability of the domain name. If the domain name is available, the Internet user may proceed with the registration process. If the domain name is not available for registration, the Internet user may keep selecting alternative domain names until an available domain name is found.

A Method and System for Semantic Domain Name Spinning

Several different methods may be used to provide and manage the disclosed invention. In an example embodiment illustrated in FIG. 1, a user may enter a domain name into a user interface on a client, possibly seeking more information about the domain name, such as domain auction or other aftermarket information, domain appraisal or evaluation information, or information about the domain's availability (Step 100). Any combination of software modules used together with hardware on a server in a data center may receive and analyze the submitted information, possibly supplemented with additional information from data storage within the data center. One or more software modules may use this analysis to extract one or more keywords from the received domain name (Step 110). Using these one or more keywords, one or more modules on a communicatively coupled server or client may build a keyword array, and this keyword array may be compared to possible matches contained in a database within data storage, which may also be communicatively coupled to the server or client (Step 120). If a match is found, the match may be appended to the result set, with exact matches in top priority; otherwise, the result set may be returned to the user and displayed on the client for purposes of domain auction, domain aftermarket, domain appraisal or availability of the domain name (Step 130). An appraisal for valuation of the domain name may also be returned and displayed to the user on the client, possibly based on the "5P" appraisal factors, discussed in detail below (Step 140).

Figure 2:
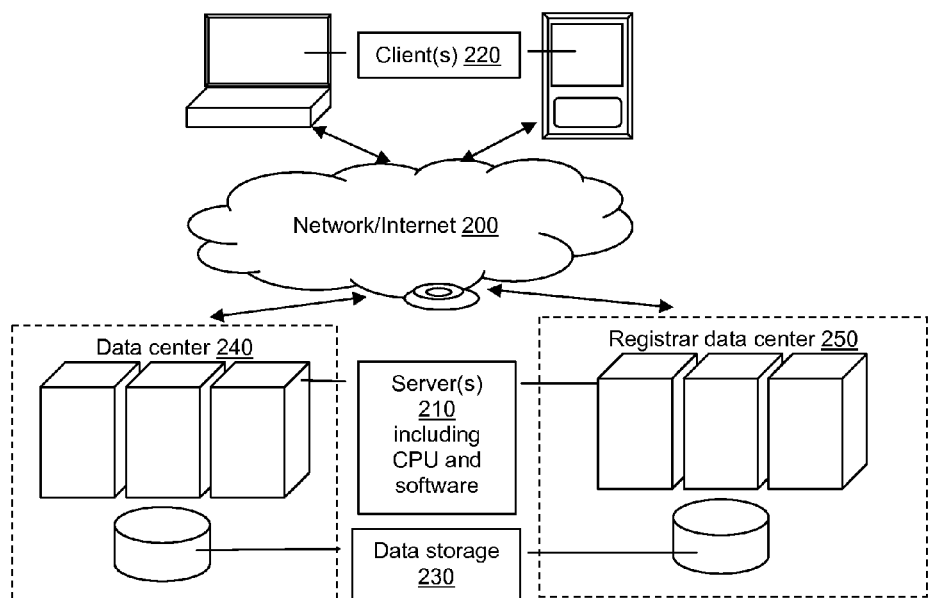
FIG. 2 illustrates a possible system for semantic domain name spinning and appraising a domain name.

Several different environments may be used to accomplish the steps of embodiments disclosed herein. FIG. 2 demonstrates a streamlined example of such an environment and illustrates a non-limiting example of a system and/or structure that may be used to accomplish the methods and embodiments disclosed and described herein. Such methods may be performed by any central processing unit (CPU) in any computing system, such as a microprocessor running on at least one server 210 and/or client 220, and executing instructions stored (perhaps as scripts and/or software, possibly as software modules) in computer-readable media accessible to the CPU, such as a hard disk drive on a server 210 and/or client 220.

The example embodiments herein place no limitations on whom or what may comprise users. Thus, as non-limiting examples, users may comprise any individual, entity, business, corporation, partnership, organization, governmental entity, and/or educational institution that may have occasion to seek information for domain spinning or appraisal.

The example embodiments shown and described herein exist within the framework of a network 200 and should not limit possible network configuration or connectivity. Such a network 200 may comprise, as non-limiting examples, any combination of the Internet, the public switched telephone network, the global Telex network, computer networks (e.g., an intranet, an extranet, a local-area network, or a wide-area network), a wired network, a wireless network, a telephone network, a corporate network backbone or any other combination of known or later developed networks.

At least one server 210 and at least one client 220 may be communicatively coupled to the network 200 via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPPoE), and/or any combination thereof.

The server(s) 210 and client(s) 220 (along with software modules and the data storage 230 disclosed herein) may be communicatively coupled to the network 200 and to each other in such as way as to allow a user to enter into a user interface on the client 220, and for the server 210 to receive, the domain name to generate the keywords to search information in data storage 230 for domain spinning information related to domain aftermarket, domain appraisal, domain availability and/or accomplish any other methods disclosed herein.

Such server(s) 210 may comprise any computer or program that provides services to other computers, programs, or users either in the same computer or over a computer network 200. As non-limiting examples, the server 210 may comprise application, communication, mail, database, proxy, fax, file, media, web, peer-to-peer, standalone, software, or hardware servers (i.e., server computers) and may use any server format known in the art or developed in the future (possibly a shared hosting server, a virtual dedicated hosting server, a dedicated hosting server, a cloud hosting solution, a grid hosting solution, or any combination thereof) and may be used, for example to provide access to the Internet, domain auction, aftermarket, availability or appraisal information, registrar domain information and/or other data requested by a client 220.

The server 210 may exist within a server cluster, as illustrated. These clusters may include a group of tightly coupled computers that work together so that in many respects they can be viewed as though they are a single computer. The components may be connected to each other through fast local area networks which may improve performance and/or availability over that provided by a single computer.

The software modules used in the context of the current invention may be stored in the memory of—and run on—at least one server 210 or client 220. As a non-limiting example of such software modules, a keyword extraction module may be used to extract keywords from the domain name to retrieve and compare information stored in data storage 230 for purposes of domain auction, domain appraisal and/or domain availability. A domain appraisal module, or several related software modules working together (disclosed below), may likewise be used to appraise the valuation of the domain name, etc. The software modules may comprise software and/or scripts containing instructions that, when executed by a microprocessor on a server 210 or client 220, cause the microprocessor to accomplish the purpose of the module or the methods disclosed herein, in this example to extract keywords from a domain name, retrieve and compare related keyword and/or domain name information from data storage

230, appraise the valuation of the domain name and/or display this domain and other retrieved information to the user on a client 220.

The client 220 may be any computer or program that provides services to other computers, programs, or users either in the same computer or over a computer network 200. As non-limiting examples, the client 220 may be an application, communication, mail, database, proxy, fax, file, media, web, peer-to-peer, or standalone computer, cell phone, personal digital assistant (PDA), etc. which may contain an operating system, a full file system, a plurality of other necessary utilities or applications or any combination thereof on the client 220. Non limiting example programming environments for client applications may include JavaScript/AJAX (client side automation), ASP, JSP, Ruby on Rails, Python's Django, PHP, HTML pages or rich media like Flash, Flex or Silverlight.

The client 220 that may be used to connect to the network 200 to accomplish the illustrated embodiments may include, but are not limited to, a desktop computer, a laptop computer, a hand held computer, a terminal, a television, a television set top box, a cellular phone, a wireless phone, a wireless hand held device, an Internet access device, a rich client, thin client, or any other client functional with a client/server computing architecture. Client software may be used for authenticated remote access to a hosting computer or server. These may be, but are not limited to being accessed by a remote desktop program and/or a web browser, as are known in the art.

Figures 7, 8:
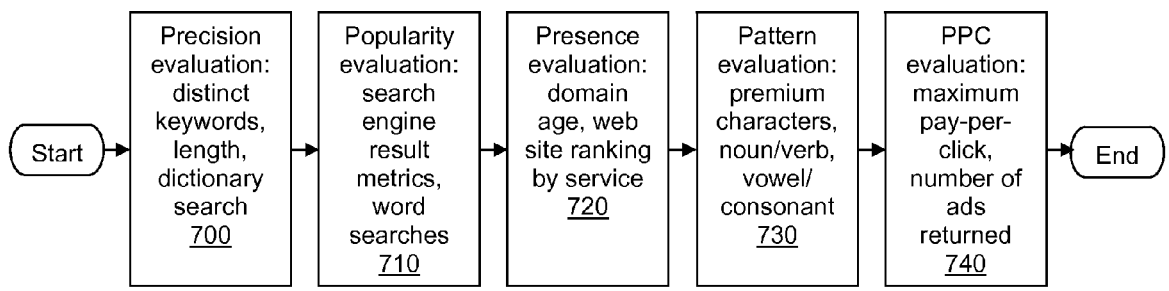
FIG. 7 is a flow diagram illustrating a possible embodiment of a method for appraising a domain name.
FIG. 8 illustrates a possible embodiment of an interface for displaying the results of the domain spinning and the certified domain appraisal process.

The user interface displayed on the client 220 or the server 210 may be any graphical, textual, scanned and/or auditory information a computer program presents to the user, and the control sequences such as keystrokes, movements of the computer mouse, selections with a touch screen, scanned information etc. used to control the program. Examples of such interfaces include any known or later developed combination of Graphical User Interfaces (GUI) or Web-based user interfaces as seen in FIG. 8, Touch interfaces, Conversational Interface Agents, Live User Interfaces (LUI), Command line interfaces, Noncommand user interfaces, Object-oriented User Interfaces (OOUI) or Voice user interfaces. The domain name information generated, or any other information, may be accepted using any field, widget and/or control used in such interfaces, including but not limited to a text-box, text field, button, hyper-link, list, drop-down list, check-box, radio button, data grid, icon, graphical image, embedded link, etc.

The server 210 and/or client 220 may be communicatively coupled to data storage 230 of domain name information, domain name appraisal information, domain name spinning information or any other information requested. The data storage 230 may be any computer components, devices, and/or recording media that may retain digital data used for computing for some interval of time. The storage may be capable of retaining stored content for the domain information or any other data requested, on a single machine or in a cluster of computers over the network 200, in separate memory areas of the same machine such as different hard drives, or in separate partitions within the same hard drive, such as a database partition.

Non-limiting examples of the data storage 230 may include, but are not limited to, a Network Area Storage, ("NAS"), which may be a self-contained file level computer data storage connected to and supplying a computer network with file-based data storage services. The storage subsystem may also be a Storage Area Network ("SAN"—an architecture to attach remote computer storage devices to servers in such a way that the devices appear as locally attached), an NAS-SAN hybrid, any other means of central/shared storage now known or later developed or any combination thereof.

Structurally, the data storage 230 may comprise any collection of data. As non-limiting examples, the data storage 230 may comprise a local database, online database, desktop database, server-side database, relational database, hierarchical database, network database, object database, object-relational database, associative database, concept-oriented database, entity-attribute-value database, multi-dimensional database, semi-structured database, star schema database, XML database, file, collection of files, spreadsheet, and/or other means of data storage such as a magnetic media, hard drive, other disk drive, volatile memory (e.g., RAM), non-volatile memory (e.g., ROM or flash), and/or any combination thereof.

The server(s) 210 or software modules within the server(s) 210 may use query languages such as MSSQL or MySQL to retrieve the content from the data storage 230. Server-side scripting languages such as ASP, PHP, CGI/Perl, proprietary scripting software/modules/components etc. may be used to process the retrieved data. The retrieved data may be analyzed in order to determine domain names and keywords recognized by the scripting language, key words to be matched to those found in data storage, availability of domain names, comparisons to appraisals of other domain names or any other method steps disclosed herein.

Another environment similar to the data center 240 may also be used to access information about a domain name on a registrar's server 210 in a registrar's data center 250. As the user accesses information about a domain name, another command from the software modules may be used to redirect to a registrar's server 210 in a registrar's data center 250. This server may also contain software components which allow a data storage 230, either separate from or integrated into the registrar's server, to access information regarding domain name spinning and appraisal for the users. The registrar's server 210 may use the registrar's data storage 230 and software modules or components on the server 210 to search for information relating to the domain name spinning or appraisal as requested by the user. If such information is available, the software modules or components on the server 210 and/or registrar's server 210 may be used to forward this information from the data storage 230 to the user/potential customer. This information may also be forwarded to an email account of the user.

In a non-limiting example embodiment, the data center 240 and/or registrar data center 250 may provide hosting services for websites, services or software relating to the domain information, or any related hosted website including, but not limited to hosting one or more computers or servers in a data center 240/250 as well as providing the general infrastructure necessary to offer hosting services to Internet users including hardware, software, Internet web sites, hosting servers, and electronic communication means necessary to connect multiple computers and/or servers to the Internet or any other network 200. These data centers 240/250 or the related clients 220 may accept messages from text messages, SMS, web, mobile web, instant message, third party API projects or other third party applications.

In an example embodiment illustrated in FIG. 1, a domain name may be received via information entered into an interface on a client 220 operated by a user of the system. The system may then parse the domain name into keywords and build an array of similar keywords based on a semantic search.

Figure 3:
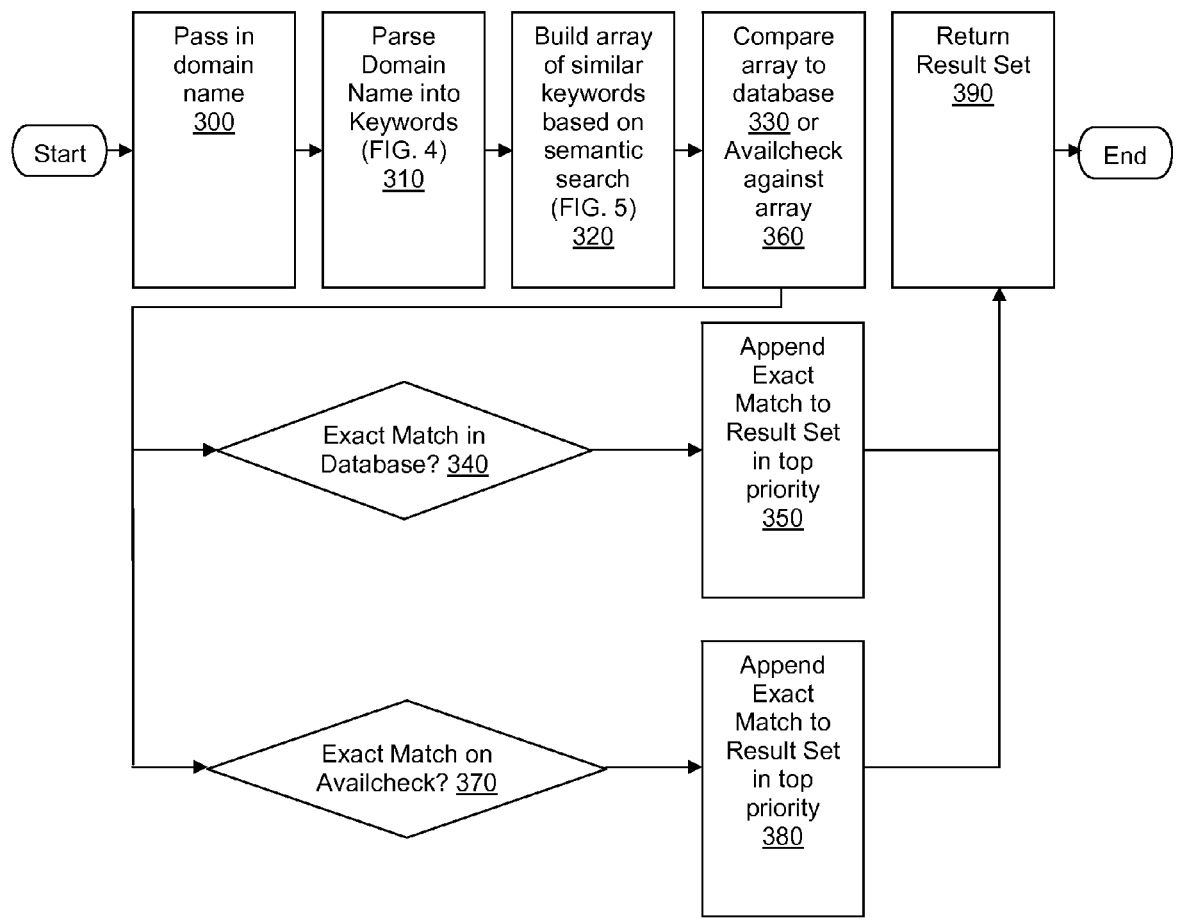
FIG. 3 is a flow diagram illustrating a possible embodiment of a method for semantic domain name spinning.

FIG. 3 shows that the embodiment illustrated in FIG. 1, as well as other disclosed embodiments, may include the steps of passing the domain name into the system (Step 300), parsing the domain name into keywords, as well as all subsequent steps described below associated with FIG. 4 (Step 310), building an array of similar keywords based on a semantic search, as well as all subsequent steps described below associated with FIG. 5 (Step 320) and comparing the keywords to return a result set (Step 390).

Two different comparisons may be made: First, in spinning the domain name, such as for auction, aftermarket or appraisal, the array of similar keywords based on the semantic search may be compared to information in data storage 230 such as a database (Step 330). If an exact match is found in the database (Step 340), the exact match may be appended to the result set in top priority (Step 350) and the result set, including the prioritized exact matches, may be returned (Step 390). In another embodiment, the array may be compared against one or more available domain names (Step 360). In spinning the domain name for a check against domain availability (Step 360), if an exact match is found in the array against a check for domain availability (Step 370), the exact match may be appended to the result set in top priority (Step 380) and the result set, including the prioritized exact matches, may be returned (Step 390). The returned result set may then be appraised for valuation of the domain name for the user (Step 140).

Figure 4:
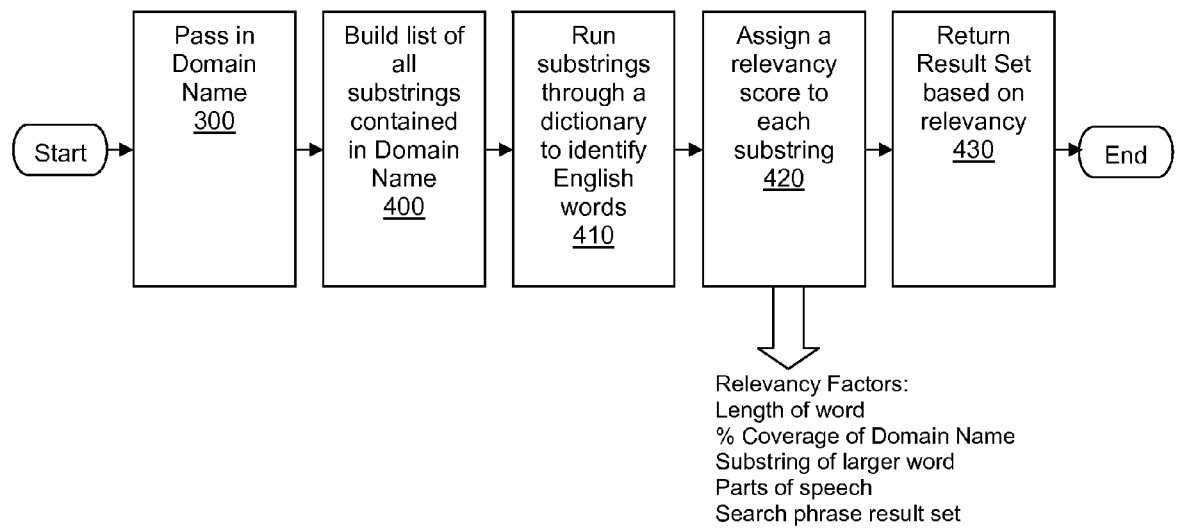
FIG. 4 is a flow diagram illustrating a possible embodiment of a method for semantic domain name spinning.

FIG. 4 shows that the embodiment illustrated in FIGS. 1 and 3, as well as other disclosed embodiments, may include the steps of passing the domain name in to the system (Step 300), building a list of all strings and/or substrings contained in the domain name (Step 400), running the strings and/or substrings through a dictionary to identify English words within the list of strings and/or substrings built from the domain name (Step 410), assigning a relevancy score to each string and/or substring (Step 420) and returning a result set based on the relevancy score assigned to each string and/or substring (Step 430). As previously disclosed, Steps 400-430, illustrated in FIG. 4, may be, but are not limited to, being sub-steps of parsing a domain name into keywords (Step 310).

The step of assigning a relevancy score to each string and/or substring (Step 420) may include, but are not limited to, several relevancy factors, including the length of the word, the percentage of coverage of the domain name, whether the substring is a substring of a larger word and/or string, the parts of speech associated with the string and/or domain name and/or a search phrase result set.

Figure 5:
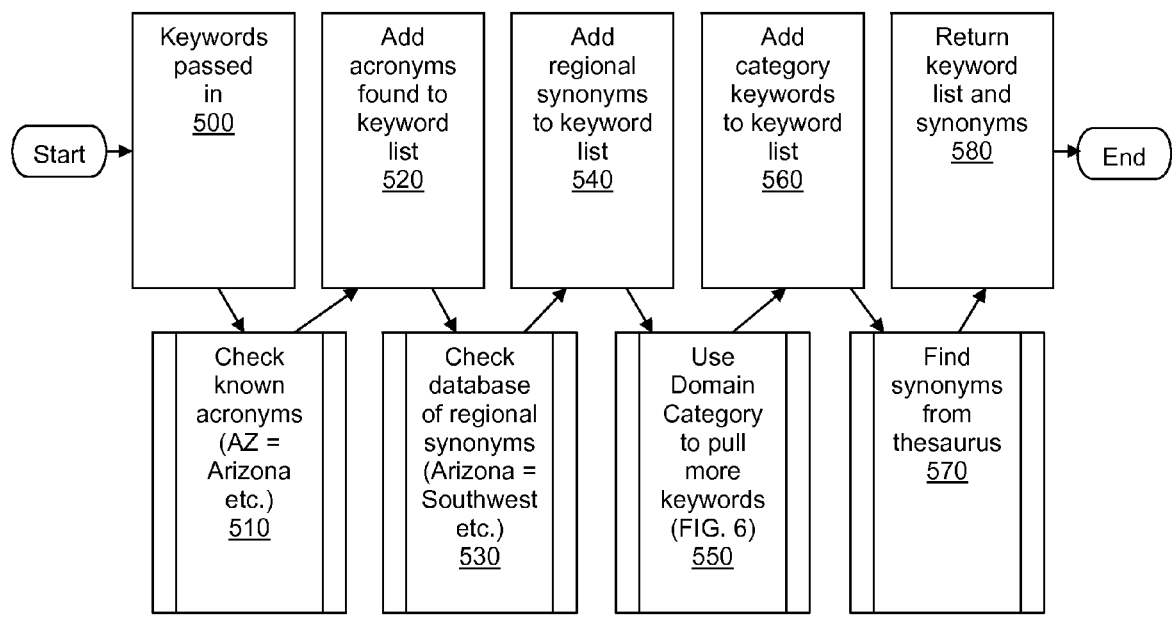
FIG. 5 is a flow diagram illustrating a possible embodiment of a method for semantic domain name spinning.

FIG. 5 shows that the embodiment illustrated in FIGS. 1 and 3, as well as other disclosed embodiments, may include the step of passing the domain name in to the system (Step 300). Passing in these keywords (Step 500) may allow additional acronyms, regional synonyms, domain category keywords and synonyms from a thesaurus to be added to the keyword list and synonyms. These additional tools may be used to build an array of similar keywords based on a semantic search (Step 320).

Once the keywords are passed in to the system (Step 500), the keywords and/or domain name may be checked for known acronyms or abbreviations (Step 510). As a non-limiting example, the keyword and/or domain name may recognize that ASU is an acronym for Arizona State University, or that Ariz. is an abbreviation for Arizona. Any acronyms and/or abbreviations found may then be added to the keyword list and/or array (Step 520).

Data storage 230, such as a database, may be used to check the domain name, each of the words in the list of keywords, substrings of the domain name/keywords, or the previously disclosed acronyms/abbreviations for matches of regional synonyms. As a non-limiting example, "Arizona State University," "Arizona," "ASU" and "AZ" may all be recognized as being synonymous with and/or associated with the word "Southwest." (Step 530). The regional synonyms may then be added to the keyword list (Step 540).

A series of domain categories may be established and used to pull more keywords, as well as all subsequent steps described below associated with FIG. 6 (Step 550). The category keywords pulled may then be added to the keyword list (Step 560). A thesaurus may then be used to find synonyms for the domain name, each of the words in the list of keywords, substrings of the domain name/keywords, or the previously disclosed acronyms/abbreviations. The keyword list, as well as any synonyms (regional or otherwise) and/or acronyms may then be returned (Step 580). As previously disclosed, Steps 500-580, illustrated in FIG. 5, may be, but are not limited to being sub-steps of building an array of similar keywords based on a semantic search (Step 320).

Figure 6:
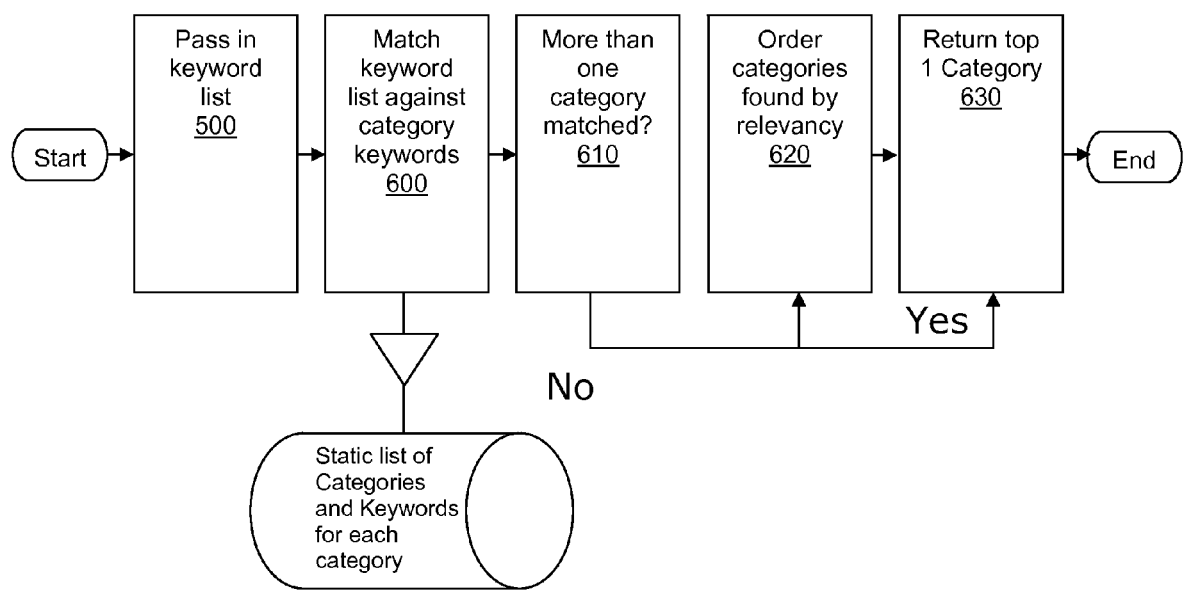
FIG. 6 is a flow diagram illustrating a possible embodiment of a method for semantic domain name spinning.

FIG. 6 shows that the embodiment illustrated in FIGS. 1, 3 and 5, as well as other disclosed embodiments, may include the steps of passing the domain name in to the system (Step 300). Once the domain name, list of keywords, acronyms/abbreviations and/or synonyms are passed in to the system (Step 500), these elements may be matched against one or more category keywords (Step 600). As seen in FIG. 6, these category keywords may be stored in data storage 230 such as a database containing a static list of categories and keywords for each category.

After matching the keyword list against the category keywords (Step 600), a determination may be made as to whether more than one category was matched (Step 610). If so, the categories found may be ordered by relevancy (Step 620). Whether or not more than one category was matched (Step 610), the top 1 category may be returned (Step 630). If more than one category was matched (Step 610), the top 1 category, as well as the categories ordered by relevancy, may also be returned (Step 630). As previously disclosed, Steps 600-630, illustrated in FIG. 6, may be, but are not limited to being sub-steps of using the domain name, list of keywords, acronyms/abbreviations and/or synonyms to pull additional keywords (Step 550).

The additional steps included in the embodiments illustrated in FIGS. 1-6 are not limited to the embodiment shown in FIG. 1, or their respective illustrated embodiments, and may be combined in several different orders and modified within multiple other disclosed embodiments. Likewise, the method steps disclosed herein may be accomplished by a software module executed on a server and/or client configured to accomplish that method step. As non-limiting examples, the method steps disclosed above may be accomplished by, but are not limited to a domain name keyword parsing software module, a keyword array building software module, a result set returning software module, an array and/or domain name comparison software module etc.

A Method and System for Domain Name Appraisal and Valuation

Several different methods may be used to provide and manage the disclosed invention. In an example embodiment illustrated in FIG. 7, a user may enter a domain name into a user interface on a client, possibly seeking more information about an appraisal or valuation of the domain name. In another embodiment, the domain name may be entered automatically into the system as a result of domain spinning, described in detail above. Any combination of software modules used together with hardware on a client 220 in a data center 240/250 may receive and analyze the submitted information from a user interface on a client 220, possibly supplemented by additional information from data storage 230 within one or more data centers 240/250 (as illustrated in FIG. 2, and described in detail above). The software modules may use this analysis to create an automated appraisal of a domain name for a certified appraisal process, possibly using an appraisal process algorithm, the appraisal process algorithm possibly contained within an appraisal software module.

The appraisal may be accomplished, as seen in FIG. 7, by dividing the valuation of the domain into five logical groupings, including evaluation of "5 P's" related to the domain name. Evaluation of "precision" may include the number of distinct keywords found, the length of the domain name and the number of keywords found in the dictionary (Step 700). Evaluation of "popularity" may include various search engine search result metrics and tracking of words searched per month (Step 710). Evaluation of "presence" may include the age of the domain, and the rank of the web site according to web ranking services or software (Step 720). Evaluation of "pattern" may include the number or percentage of premium characters, the part of speech (such as noun, plural noun, verb, adjective, etc., possibly considering if the domain is a one word domain), the relationship of vowels and consonants (possibly considering if the domain is a 4-5 character word) (Step 730). Evaluation of Pay-Per-Click, or PPC, may include the maximum number of pay-per-click bids from various advertising tracking services of software, and the number of ads returned within search engine searches (Step 740). A dynamic multiplier based on registration statistics for each top level domain (TLD), as well as other evaluation elements described in detail below, may then be applied to the domain appraisal and/or valuation. This may be used to give a very accurate measure of domain scarcity to let a user or evaluator know how rare a domain name is.

Precision, the first of the 5 P's evaluated, may include one or more precision-determining elements. These precision-determining elements may include the following: the number of distinct keywords found in the domain name, whether the keywords are found in the dictionary, possibly including the number of keywords found, the length of the domain name and whether numerals are found in the domain name, possibly including the number of numerals found. These precision-determining elements may be stored in data storage 230 and assigned values used to determine the domain name's appraisal value and/or valuation.

A precision-determining algorithm may be established, stored and/or contained within one or more software modules, possibly one or more precision-determining software modules. Such algorithms and software modules may be stored and executed within an environment in a data center 240/250 using a server 210, client 220 and/or data storage 230, any or all of which may be communicatively coupled to a network 200.

This precision-determining algorithm, which may be substantially similar to that demonstrated in the non-limiting example embodiment(s) below and throughout this disclosure, may assign values to the precision-determining elements and/or may use these and/or other previously-stored precision-determining elements to determine the precision of the domain name, which in turn may be used to determine the appraisal value and/or valuation of the domain name.

The one or more software modules, possibly one or more precision-determining software modules containing the precision-determining algorithm, may be executed by a processor on a server 210, and the results may be sent through a network 200 and displayed on a user interface on a client 220.

In another non-limiting example embodiment, the elements may be stored in a local database, spreadsheet and/or any other data storage 230 on the client 220. In this embodiment, one or more software modules, possibly one or more precision-determining software modules, software modules within a local database or spreadsheet, or any combination thereof may be used to calculate and execute the precision-determining algorithm.

As a non-limiting example, a spreadsheet may determine the Precision of the domain name by using any combination of software modules described above to store, calculate and/or execute the following precision-determining algorithm:

$$=(IF(AND(words=1,dictionary=1),500,0)+IF(words=2,0,0)+IF(words=3,-100,0)+IF(words=4,-500,0)+IF(words>4,-1000,0)+IF(dictionary=1,100,-100)+IF(length<3,500,0)+IF(length=3,400,0)+IF(length=4,100,0)+IF(length=5,25,0)+IF(AND(length>5,length<11),0,0)+IF(AND(length>10,length<16),-50,0)+IF(length>15,-100,0)+IF(numbers=1,-70,0))$$

In this non-limiting example, the spreadsheet may have columns, and/or data storage 230 may have a data field for each of the precision-determining elements, and may have an additional column and/or data field to store the calculated Precision of the domain name. In other embodiments, each of the precision-determining elements, as well as the calculated Precision of the domain name may be calculated and/or stored in data fields in data storage 230. The precision-determining elements may include, but are not limited to, "words," "dictionary," "length" and "numbers."

The column and/or data field for "words" may calculate and/or store the number of words and/or keywords in the domain name. As non-limiting examples, america.us, jackaroo.com, urir.com, flippity.com, planets.com, witchcraft.com, masks.org, fuel.net, whatever.com, guns.com, compassion.org, antalya.com, joust.com and islam.net may all be one-word domain names, and thus would have a number 1 calculated and/or stored in the "words" column of the spreadsheet and/or data field of data storage 230.

Two-word domain names, having a number 2 calculated and/or stored in the "words" column and/or data field may include, as non-limiting examples, 12steps.com, finnishfelines.com, iowacars.com, pokerpinnacle.com, smokelover.com, any-cell.com, safelysent.com, sweetrings.com, goldminers.com, globalwarming.com, tagcloud.com, fungamez.com and tourbus.com.

Three-word domain names, having a number 3 calculated and/or stored in the "words" column and/or data field may include, as non-limiting examples, figureitout.com, onlinelampguide.com, yourfavoriteplace.com, aroundtheworld.com and realestateads.com.

The column and/or data field for "dictionary" may calculate and/or store a determination of whether the domain name and/or any keywords in the domain name (without the TLD or "top level domain" such as .com, .us, .net, .org etc.) are a word or words found in the dictionary. This determination can be calculated and/or stored as a TRUE/FALSE value, or possibly numerically as a 1 or 0.

As non-limiting examples planets.com, guns.com, whatever.com and witchcraft.com may all be found in the dictionary, and thus would have a number 1 or a value of TRUE calculated and/or stored in the "dictionary" column of the spreadsheet and/or data field of data storage 230, while urirr-.com, flippity.com, pokerpinacle.com and fungamez.com would have a number 0 or a value of FALSE calculated and/or stored in the "dictionary" column of the spreadsheet or data field of data storage 230.

The column and/or data field for "length" may calculate (possibly using a =LEN([appropriate field]) calculation in a database) and/or store the length of, or number of letters in, the domain name and/or any keywords in the domain name (without the TLD or "top level domain" such as .com, .us, .net, .org etc.). In other words, "length" may determine and store how many characters are in the word and/or any keywords within the domain name. As a non-limiting example, planets.com would have a length of 7 letters, and thus would have a number 7 calculated and/or stored in the "length" column of the spreadsheet and/or data field of data storage 230. Likewise, guns.com would have a length of 4 letters, and thus would have a number 4 calculated and/or stored in the "length" column of the spreadsheet or data field of data storage 230.

The column and/or data field for "numbers" may calculate and/or store a determination of whether the domain name and/or keywords in the domain name contain numbers. In other words, "numbers" may determine if the domain contains numerals. This determination can be calculated and/or stored as a TRUE/FALSE value, or possibly numerically as a 1 or 0. As non-limiting examples 12steps.com contains numerals, and thus would have a number 1 or a value of TRUE calculated and/or stored in the "numbers" column of the spreadsheet and/or data field of data storage 230, while the other domain names listed above would have a number 0 or a value of FALSE calculated and/or stored in the "numbers" column of the spreadsheet and/or data field of data storage 230.

After the precision-determining elements are calculated and/or stored, the precision-determining algorithm may then evaluate and use any combination of the precision-determining elements or other disclosed elements to calculate and/or store the Precision of the domain name. The value assigned to a particular precision-determining element may increase or decrease the value of the Precision of the domain name, and in turn may increase or decrease the appraisal and/or valuation of the domain name itself.

In a non-limiting example embodiment, this process may be initiated by evaluating, by the precision-determining algorithm, the values assigned to the "words" and "dictionary" precision-determining elements and assigning an initial value to the Precision of the domain name. If both values are any combination of 1 and/or TRUE, indicating there is only one word in the domain name and that the domain name and/or keyword is found in the dictionary, the value of the domain name will be greater, thus the initial value of the Precision of the domain name will also be higher.

In the non-limiting example algorithm above, if the "words" and "dictionary" columns and/or data fields both have a value of 1 (or TRUE), indicating a 1-word domain name and that the 1 word is in the dictionary, the Precision of the domain name may be assigned an initial value of 500. If either of the values are not 1 (or FALSE), indicating a greater-than-one-word domain name, or that the 1 or more words are not in the dictionary, the Precision may be assigned an initial value of 0. Thus, the precision-determining algorithm may increase the initial value of the Precision of the domain name, and by extension, the appraisal and/or valuation of the domain name itself, depending on whether the "words" and "dictionary" columns and/or data fields both have a value of 1 (or TRUE, indicating a 1-word domain name and that the 1 word is in the dictionary).

The value assigned to the "words" and "dictionary" precision-determining elements may each be evaluated individually to determine the number of words in the domain name and whether the words are found in the dictionary respectively. Depending on the value assigned to these precision determining elements, the initial value assigned to the Precision of the domain name may be increased or decreased accordingly.

In the non-limiting example algorithm above, if the "words" data field has a value of 2, no change would be made to the initial value. If the value is 3, the initial value for Precision may be reduced by 100. If the value is 4, the initial value for Precision may be reduced by 500. If the value is greater than 4, the initial value for Precision may be reduced by 1000. Thus, the precision-determining algorithm may increase or decrease by degrees the Precision of the domain name, and by extension, the appraisal and/or valuation of the domain name, depending on whether the domain name has one word or more than one word respectively, single words being preferable to multiple words.

In the non-limiting example algorithm above, if the "dictionary" data field has a value of 1 (or TRUE), indicating that the domain name is found in the dictionary, the total value may be increased by 100, otherwise the total value may be decreased by 100. Thus, the precision-determining algorithm may increase or reduce the Precision of the domain name, and by extension, the appraisal and/or valuation of the domain name, depending on whether the domain name and/or keywords within the domain name are or are not words found in the dictionary respectively, words found in the dictionary being preferable.

The value assigned to the "length" precision-determining element may each be evaluated by the precision-determining algorithm to determine the length of, or number of letters in, the domain name and/or any keywords in the domain name (without the TLD or "top level domain" such as .com, .us, .net, .org etc.). In the non-limiting example algorithm above, if the "length" data field has a value of less than 3, the total value for Precision may be increased by 500. If the value is 3, the total value for Precision may be increased by 400. If the value is 4, the total value for Precision may be increased by 100. If the value is 5, the total value for Precision may be increased by 25. If the value is between 5 and 10, the total value for Precision may be neither increased nor reduced. If the value is between 11 and 15, the total value for Precision may be reduced by 50. If the value is greater than 15, the total value for Precision may be reduced by 100. Thus, the precision-determining algorithm may increase or reduce by degrees the Precision of the domain name, and by extension, the appraisal and/or valuation of the domain name, depending on the length of, or number of letters in, the domain name, lower length being preferable to high length.

The value assigned to the "numbers" precision-determining element may each be evaluated by the precision-determining algorithm to determine whether the domain name and/or keywords in the domain name contain numerals. In the non-limiting example algorithm above, if the "numbers" data field has a value of 1 (or TRUE), indicating that the domain name and/or keywords contain a numeral, the total value may be decreased by 70, otherwise the total value may be neither increased nor reduced. Thus, the precision-determining algorithm may increase or reduce the Precision of the domain name, and by extension, the appraisal and/or valuation of the domain name, depending on whether the domain name and/or keywords within the domain name contains numerals, numerals being less preferable.

Popularity, the second of the 5 P's evaluated, may include one or more popularity-determining elements. These popularity-determining elements may include various search result metrics measured by a search engine such as GOOGLE, and/or estimated searches per month as measured by a search engine optimization monitoring service and/or software such as WORDTRACKER. These popularity-determining elements may be stored in data storage 230 and assigned values used to determine the domain name's appraisal value and/or valuation.

A popularity-determining algorithm may be established, stored and/or contained within one or more software modules, possibly one or more popularity-determining software modules. Such algorithms and software modules may be stored and executed within an environment in a data center 240/250 using a server 210, client 220 and/or data storage 230, any or all of which may be communicatively coupled to a network 200.

This popularity-determining algorithm, which may be substantially similar to that demonstrated in the non-limiting example embodiment(s) below and throughout this disclosure, may assign values to the popularity-determining elements and/or may use these and/or other previously-stored popularity-determining elements to determine the popularity of the domain name, which in turn may be used to determine the appraisal value and/or valuation of the domain name.

The one or more software modules, possibly one or more popularity-determining software modules containing the popularity-determining algorithm, may be executed by a processor on a server 210, and the results may be sent through a network 200 and displayed on a user interface on a client 220.

In another non-limiting example embodiment, the elements may be stored in a local database, spreadsheet and/or any other data storage 230 on the client 220. In this embodiment, one or more software modules, possibly one or more popularity-determining software modules, software modules within a local database or spreadsheet, or any combination thereof may be used to calculate and execute the popularity-determining algorithm.

As a non-limiting example, a spreadsheet may determine the Popularity of the domain name by using any combination of software modules described above to store, calculate and execute the following popularity-determining algorithm:

$$=(((GP*0.05)+(GA*0.05)+(GT*0.2))/3000)+(WT*20)$$

In this non-limiting example, the spreadsheet may have columns, and/or data storage 230 may have a data field for each of the popularity-determining elements, and may have an additional column and/or data field to store the calculated Popularity of the domain name. In other embodiments, each of the popularity-determining elements, as well as the calculated Precision of the domain name may be calculated and/or stored in data fields in data storage 230.

The popularity-determining elements may include, but are not limited to, three possible metrics for various search results from a search engine such as GOOGLE. These elements are represented by GP, GA and GT respectively in the non-limiting example popularity-determining algorithm above. The precision-determining elements may also include, but are not limited to a metric for estimated searches per month as measured by a search engine optimization monitoring service and/or software such as WORDTRACKER.

The value assigned to the three popularity-determining elements related to search result metrics measured by a search engine may each be evaluated to determine the Popularity related to these metrics. In the non-limiting example algorithm above, these popularity-determining elements related to search result metrics measured by a search engine may be multiplied by a multiplier (the first and second elements by 0.05, and the third by 0.2), and the result of these calculations may then be summed together and divided by 3000.

The popularity-determining elements related to estimated searches per month as measured by a search engine optimization monitoring service and/or software may be multiplied by a multiplier (in this example 20), and the result of these calculations may then be summed together with the previous calculation related to search result metrics measured by a search engine. Thus, the popularity-determining algorithm may increase or reduce by degrees the Popularity of the domain name, and by extension, the appraisal and/or valuation of the domain name, depending on the results of the search result metrics measured by a search engine and a search engine optimization monitoring service and/or software.

After the popularity-determining elements are calculated and/or stored, the popularity-determining algorithm may then evaluate and use any combination of the popularity-determining elements or other disclosed elements to calculate and/or store the Popularity of the domain name. The value assigned to a particular popularity-determining element may increase or decrease the value of the Popularity of the domain name, and in turn may increase or decrease the appraisal and/or valuation of the domain name itself.

Presence, the third of the 5 P's evaluated, may include one or more presence-determining elements. These presence-determining elements may include the following: the age of the domain name and a ranking for the domain name using a domain ranking service such as ALEXA. These presence-determining elements may be stored in data storage 230 and assigned values used to determine the domain name's appraisal value and/or valuation.

A presence-determining algorithm may be established, stored and/or contained within one or more software modules, possibly one or more presence-determining software modules. Such algorithms and software modules may be stored and executed within an environment in a data center 240/250 using a server 210, client 220 and/or data storage 230, any or all of which may be communicatively coupled to a network 200.

This presence-determining algorithm, which may be substantially similar to that demonstrated in the non-limiting example embodiment(s) below and throughout this disclosure, may assign values to the presence-determining elements and/or may use these and/or other previously-stored presence-determining elements to determine the presence of the domain name, which in turn may be used to determine the appraisal value and/or valuation of the domain name.

The one or more software modules, possibly one or more presence-determining software modules containing the presence-determining algorithm, may be executed by a processor on a server 210, and the results may be sent through a network 200 and displayed on a user interface on a client 220.

In another non-limiting example embodiment, the elements may be stored in a local database, spreadsheet and/or any other data storage 230 on the client 220. In this embodiment, one or more software modules, possibly one or more presence-determining software modules, software modules within a local database or spreadsheet, or any combination thereof may be used to calculate and execute the presence-determining algorithm.

As a non-limiting example, a spreadsheet may determine the Presence of the domain name by using any combination of software modules described above to store, calculate and execute the following presence-determining algorithm:

=(IF(Age<1,−50,0)+IF(AND(Age>0,Age<3),−25,
0)+IF(AND(Age>2,Age<5),0,0)+IF(AND(Age>4,Age<8),200,0)+IF(Age>7,500,0)+IF(Alexa=0,
0)+IF(AND(Alexa>0,Alexa<100000),7500,0)+IF(AND(Alexa>100000,Alexa<300000),4000,
0)+IF(AND(Alexa>300000,Alexa<500000),2000,0)+IF(AND(Alexa>500000,Alexa<1000000),
1000,0)+IF(AND(Alexa>1000000,Alexa<2000000),700,0)+IF(AND(Alexa>2000000,Alexa<3000000),
500,0)+IF(AND(Alexa>3000000,Alexa<4000000),200,0)+IF(AND(Alexa>4000000,
Alexa<5000000),100,0)+IF(Alexa>5000000,25,0))

In this non-limiting example, the spreadsheet may have columns, and/or data storage 230 may have a data field for each of the presence-determining elements, and may have an additional column and/or data field to store the calculated Presence of the domain name. In other embodiments, each of the presence-determining elements, as well as the calculated Presence of the domain name may be calculated and/or stored in data fields in data storage 230. The presence-determining elements may include, but are not limited to, "Age" and "Alexa"

The column and/or data field for "Age" may calculate and/or store the age of the domain name. No limitations should be placed on the time-intervals for the "Age." For example, Age could be measured in days, weeks, months, years, etc. As a non-limiting example, the age in the example algorithm above may measure the age of the domain name in years, so a 4-year-old domain name would have a number 4 calculated and/or stored in the "Age" column of the spreadsheet or data field of data storage 230.

The column and/or data field for "Alexa" may calculate and/or store the ranking for the domain name using a domain-name ranking service such as ALEXA. As a non-limiting example, a domain name with an ALEXA rank of 2,162,313 would have that number calculated and/or stored in the "Alexa" column of the spreadsheet or data field of data storage 230.

After the presence-determining elements are calculated and/or stored, the presence-determining algorithm may then evaluate and use any combination of the presence-determining elements or other disclosed elements to calculate and/or store the Presence of the domain name. The value assigned to a particular presence-determining element may increase or decrease the value of the Presence of the domain name, and in turn may increase or decrease the appraisal and/or valuation of the domain name itself.

The value assigned to the "Age" presence-determining element may each be evaluated to determine the age of the domain name. In the non-limiting example algorithm above, if the "Age" data field has a value of less than 3, the total value for Presence may be reduced by 25. If the value is between 3 and 4, the total value for Presence may be neither increased nor decreased. If the value is between 5 and 7, the total value for Presence may be increased by 200. If the value is greater than 7, the total value for Precision may be increased by 500. Thus, the presence-determining algorithm may increase or reduce by degrees the Presence of the domain name, and by extension, the appraisal and/or valuation of the domain name, depending on the age of the domain name, higher age being preferable to lower age.

The value assigned to the "Alexa" presence-determining element may each be evaluated to determine the rank of the domain name according to a domain-name ranking service such as ALEXA. In the non-limiting example algorithm above, if the "Alexa" data field has a value of between 0 and 100000, the total value for Presence may be increased by 7500. If the "Alexa" data field has a value of between 100000 and 300000, the total value for Presence may be increased by 4000. If the "Alexa" data field has a value of between 300000 and 500000, the total value for Presence may be increased by 2000. If the "Alexa" data field has a value of between 500000 and 1000000, the total value for Presence may be increased by 1000. If the "Alexa" data field has a value of between 1000000 and 2000000, the total value for Presence may be increased by 700. If the "Alexa" data field has a value of between 2000000 and 3000000, the total value for Presence may be increased by 500. If the "Alexa" data field has a value of between 3000000 and 4000000, the total value for Presence may be increased by 200. If the "Alexa" data field has a value of between 4000000 and 5000000, the total value for Presence may be increased by 100. If the "Alexa" data field has a value greater than 5000000, the total value for Presence may be increased by 25. Thus, the presence-determining algorithm may increase the Presence of the domain name, and by extension, the appraisal and/or valuation of the domain name, depending on the ranking of the domain name.

Pattern, the fourth of the 5 P's evaluated, may include one or more pattern-determining elements. These pattern-determining elements may include the following: the number of premium characters found in the domain name, the part of speech found in the domain name (possibly evaluating if the part of speech is only one word) and the vowel-consonant relationship of the domain name (possibly evaluating whether the domain name is limited to 4 or 5 characters). These pattern-determining elements may be stored in data storage 230 and assigned values used to determine the domain name's appraisal value and/or valuation.

A pattern-determining algorithm may be established, stored and/or contained within one or more software modules, possibly one or more pattern-determining software modules. Such algorithms and software modules may be stored and executed within an environment in a data center 240/250 using a server 210, client 220 and/or data storage 230, any or all of which may be communicatively coupled to a network 200.

This pattern-determining algorithm, which may be substantially similar to that demonstrated in the non-limiting example embodiment(s) below and throughout this disclosure, may assign values to the pattern-determining elements and/or may use these and/or other previously-stored pattern-determining elements to determine the pattern of the domain name, which in turn may be used to determine the appraisal value and/or valuation of the domain name.

The one or more software modules, possibly one or more pattern-determining software modules containing the pattern-determining algorithm, may be executed by a processor on a server 210, and the results may be sent through a network 200 and displayed on a user interface on a client 220.

In another non-limiting example embodiment, the elements may be stored in a local database, spreadsheet and/or any other data storage 230 on the client 220. In this embodiment, one or more software modules, possibly one or more pattern-determining software modules, software modules within a local database or spreadsheet, or any combination thereof may be used to calculate and execute the pattern-determining algorithm.

As a non-limiting example, a spreadsheet may determine the Pattern of the domain name by using any combination of software modules described above to store, calculate and execute the following pattern-determining algorithm:

=IF(VCVCV=1,10,0)+IF(CVCVC=1,15,0)+IF(CVCV=1,20,0)+IF(VCVC=1,18, 0)+IF(VCCV=1,10,0)+IF(CVVC=1,10,0)+IF(prem100=1,15,0)+IF(prem75=1,10,0)+IF(prem50= 1,0,0)+IF(prem0=1,−15,0)+IF(Noun=1,1500,0)+IF(PluralNoun=1,2000,0)

In this non-limiting example, the spreadsheet may have columns, and/or data storage 230 may have a data field for each of the pattern-determining elements, and may have an additional column and/or data field to store the calculated Pattern of the domain name. In other embodiments, each of the pattern-determining elements, as well as the calculated Pattern of the domain name may be calculated and/or stored in data fields in data storage 230. The pattern-determining elements may include, but are not limited to, "VCVCV" (indicating a pattern of vowel, consonant, vowel, consonant, vowel), "CVCVC" (indicating a pattern of consonant, vowel, consonant, vowel, consonant), "CVCV" (indicating a pattern of consonant, vowel, consonant, vowel), "VCVC" (indicating a pattern of vowel, consonant, vowel, consonant), "VCCV" (indicating a pattern of vowel, consonant, consonant, vowel), "CVVC" (indicating a pattern of consonant, vowel, vowel, consonant), "100% Prem," "75-99% Prem," "50-75% Prem," "0-50% Prem," "Noun," "Plural Noun," "Verb," "Adjective," etc.

The column and/or data fields for the vowel and consonant pattern-determining elements (including VCVCV, CVCVC, CVCV, VCVC, VCCV and CVVC in the non-limiting example elements above) may calculate and/or store a determination of whether the domain name and/or keywords in the domain name contain a corresponding pattern of vowels and consonants. This determination can be calculated and/or stored as a TRUE/FALSE value, or possibly numerically as a 1 or 0. In other non-limiting embodiments, the actual pattern of vowels and consonants may be calculated and/or stored in the data fields.

As non-limiting examples urir.com may be found to have the vowel and consonant pattern of VCVC, and thus would have a number 1 or a value of TRUE calculated and/or stored in the "VCVC" column of the spreadsheet and/or data field of data storage 230, while fuel.net would have a number 1 or a value of TRUE calculated and/or stored in the "CVVC" column of the spreadsheet or data field of data storage 230.

The column and/or data fields for the premium characters pattern-determining elements (including prem100, prem75, prem50 and prem0 in the non-limiting example elements above) may calculate and/or store a determination of whether the domain name and/or keywords in the domain name contain a corresponding pattern of premium characters. This determination can be calculated and/or stored as a TRUE/FALSE value, or possibly numerically as a 1 or 0. In other non-limiting embodiments, the actual pattern of premium characters may be calculated and/or stored in the data fields.

As non-limiting examples planets.com may be found to have 100% of the premium characters (corresponding to prem100), and thus would have a number 1 or a value of TRUE calculated and/or stored in the "100% Prem" column of the spreadsheet and/or data field of data storage 230. Witchcraft.com, whatever.com and guns.com may be found to have between 75% and 99% of the premium characters (corresponding to prem75), and thus would have a number 1 or a value of TRUE calculated and/or stored in the "75-99% Prem" column of the spreadsheet or data field of data storage 230. 12steps.com may be found to have between 50% and 75% of the premium characters (corresponding to prem50), and thus would have a number 1 or a value of TRUE calculated and/or stored in the "50-75% Prem" column of the spreadsheet or data field of data storage 230. A similar logic may be applied for prem0 and the "0-50% Prem" column of the spreadsheet or data field of data storage 230.

The column and/or data fields for the part of speech pattern-determining elements (including Noun, PluralNoun, etc. in the non-limiting example elements above) may calculate and/or store a determination of whether the domain name and/or keywords in the domain name contain a corresponding pattern of the part of speech found. This determination can be calculated and/or stored as a TRUE/FALSE value, or possibly numerically as a 1 or 0. In other non-limiting embodiments, the actual part of speech may be calculated and/or stored in the data fields.

As non-limiting examples witchcraft.com may each be found to be a Noun, and thus would have a number 1 or a value of TRUE calculated and/or stored in the "Noun" column of the spreadsheet and/or data field of data storage 230. Planets.com and guns.com may each be found to be a Plural Noun, and thus would have a number 1 or a value of TRUE calculated and/or stored in the "Plural Noun" column of the spreadsheet or data field of data storage 230.

After the pattern-determining elements are calculated and/or stored, the pattern-determining algorithm may then evaluate and use any combination of the pattern-determining elements or other disclosed elements to calculate and/or store the Pattern of the domain name. The value assigned to a particular pattern-determining element may increase or decrease the value of the Pattern of the domain name, and in turn may increase or decrease the appraisal and/or valuation of the domain name itself.

The value assigned to the vowel and consonant pattern-determining elements (including VCVCV, CVCVC, CVCV, VCVC, VCCV and CVVC in the non-limiting example elements above) may each be evaluated to determine whether the domain name and/or keywords in the domain name contain the corresponding pattern of vowels and consonants.

In the non-limiting example algorithm above, if the corresponding vowel and consonant data field has a value of 1 (or TRUE), indicating that the domain name and/or keywords contain that particular pattern of vowels and consonants, the total value may be increased (by 10, 15, 20, 18, 10 or 10 respectively, in this example), otherwise the total value may be neither increased nor reduced. Thus, the pattern-determining algorithm may increase the Pattern of the domain name, and by extension, the appraisal and/or valuation of the domain name, depending on whether the domain name and/or keywords within the domain name contain the corresponding vowel and consonant pattern-determining elements, with certain patterns being preferable.

The value assigned to the percentage of premium characters pattern-determining elements (including prem100, prem75, prem50 and prem0 in the non-limiting example elements above) may each be evaluated to determine whether the domain name and/or keywords in the domain name contain the corresponding percentage of premium characters within the pattern.

In the non-limiting example algorithm above, if the corresponding percentage of premium characters data field has a value of 1 (or TRUE), indicating that the domain name and/or keywords contain that particular percentage of premium characters, the total value may be increased or reduced by degrees (by 15, 10, 0 or −15 respectively, in this example), otherwise the total value may be neither increased nor reduced. Thus, the pattern-determining algorithm may increase or reduce the Pattern of the domain name, and by extension, the appraisal and/or valuation of the domain name, depending on whether the domain name and/or keywords within the domain name contain a corresponding percentage of premium characters pattern-determining elements, with higher percentages of premium characters being preferable.

The value assigned to the part of speech pattern-determining elements (including Noun, PluralNoun, etc. in the non-limiting example elements above) may each be evaluated to determine whether the domain name and/or keywords in the domain name contain the corresponding part of speech within the pattern.

In the non-limiting example algorithm above, if the corresponding part of speech data field has a value of 1 (or TRUE), indicating that the domain name and/or keywords contain that particular part of speech, the total value may be increased (by 1500 or 2000 respectively, in this example), otherwise the total value may be neither increased nor reduced. Thus, the pattern-determining algorithm may increase the Pattern of the domain name, and by extension, the appraisal and/or valuation of the domain name, depending on whether the domain name and/or keywords within the domain name contain corresponding part of speech pattern-determining elements, with recognized parts of speech being preferable.

Pay-per-click or PPC, the fifth of the 5 P's evaluated, may include one or more PPC-determining elements. These PPC-determining elements may include various pay-per-click bid metrics measured by a service and/or software such as ADWORDS and/or the number of ads returned as measured by a search engine such as GOOGLE. These PPC-determining elements may be stored in data storage 230 and assigned values used to determine the domain name's appraisal value and/or valuation.

A PPC-determining algorithm may be established, stored and/or contained within one or more software modules, possibly one or more PPC-determining software modules. Such algorithms and software modules may be stored and executed within an environment in a data center 240/250 using a server 210, client 220 and/or data storage 230, any or all of which may be communicatively coupled to a network 200.

This PPC-determining algorithm, which may be substantially similar to that demonstrated in the non-limiting example embodiment(s) below and throughout this disclosure, may assign values to the PPC-determining elements and/or may use these and/or other previously-stored PPC-determining elements to determine the PPC of the domain name, which in turn may be used to determine the appraisal value and/or valuation of the domain name.

The one or more software modules, possibly one or more PPC-determining software modules containing the PPC-determining algorithm, may be executed by a processor on a server 210, and the results may be sent through a network 200 and displayed on a user interface on a client 220.

In another non-limiting example embodiment, the elements may be stored in a local database, spreadsheet and/or any other data storage 230 on the client 220. In this embodiment, one or more software modules, possibly one or more PPC-determining software modules, software modules within a local database or spreadsheet, or any combination thereof may be used to calculate and execute the PPC-determining algorithm.

As a non-limiting example, a spreadsheet may determine the PPC of the domain name by using any combination of software modules described above to store, calculate and execute the following PPC-determining algorithm:

$$=(PPCBid*100)+(Ads*50)$$

In this non-limiting example, the spreadsheet may have columns, and/or data storage 230 may have a data field for each of the PPC-determining elements, and may have an additional column and/or data field to store the calculated PPC of the domain name. In other embodiments, each of the PPC-determining elements, as well as the calculated PPC of the domain name may be calculated and/or stored in data fields in data storage 230.

The PPC-determining elements may include, but are not limited to, metrics for various pay-per-click bid metrics measured by a service and/or software such as ADWORDS, and/or The PPC-determining elements may also include, but are not limited to a metric for the number of ads returned as measured by a search engine such as GOOGLE.

The value assigned to the various pay-per-click bid metrics measured by a service may each be evaluated to determine the PPC related to these metrics. In the non-limiting example algorithm above, these PPC-determining elements related to various pay-per-click bid metrics may be multiplied by a multiplier (in this example 100).

The PPC-determining elements related to the number of ads returned as measured by a search engine may also be multiplied by a multiplier (in this example 50), and the result of this calculation may then be summed together with the previous calculation related to various pay-per-click bid metrics measured by a service and/or software. Thus, the PPC-determining algorithm may increase or reduce the PPC of the domain name, and by extension, the appraisal and/or valuation of the domain name, depending on the results of the various pay-per-click bid metrics measured by a service and/or the number of ads returned as measured by a search engine.

After the PPC-determining elements are calculated and/or stored, the PPC-determining algorithm may then evaluate and use any combination of the PPC-determining elements or other disclosed elements to calculate and/or store the PPC of the domain name. The value assigned to a particular PPC-determining element may increase or decrease the value of the PPC of the domain name, and in turn may increase or decrease the appraisal and/or valuation of the domain name itself.

Valuation, determined by the elements below, as well as the 5 P's evaluated and their respective elements, may also include one or more valuation-determining elements. These valuation-determining elements, possibly used in conjunction with the 5 P's evaluated, as well as each of the respective elements used to determine them, may include the following:

The domain name separate from the TLD, the TLD associated with the domain name, the availability of the domain name with a .com TLD, a multiplier for the domain name's TLD, a determination of whether or not the domain name contains dashes, as well as the number of dashes, if any, found in the domain name and a multiplier adjusted for domain names containing dashes. These valuation-determining elements may be stored in data storage 230 and assigned values used to determine the domain name's appraisal value and/or valuation.

A valuation-determining algorithm may be established, stored and/or contained within one or more software modules, possibly one or more valuation-determining software modules. Such algorithms and software modules may be stored and executed within an environment in a data center 240/250 using a server 210, client 220 and/or data storage 230, any or all of which may be communicatively coupled to a network 200.

This valuation-determining algorithm, which may be substantially similar to that demonstrated in the non-limiting example embodiment(s) below and throughout this disclosure, may assign values to the valuation-determining elements and/or may use these and/or other previously-stored valuation-determining elements to determine the valuation of the domain name, which in turn may be used to determine the appraisal value of the domain name.

The one or more software modules, possibly one or more valuation-determining software modules containing the valuation-determining algorithm, may be executed by a processor on a server 210, and the results may be sent through a network 200 and displayed on a user interface on a client 220.

In another non-limiting example embodiment, the elements may be stored in a local database, spreadsheet and/or any other data storage 230 on the client 220. In this embodiment, one or more software modules, possibly one or more valuation-determining software modules, software modules within a local database or spreadsheet, or any combination thereof may be used to calculate and execute the valuation-determining algorithm.

As a non-limiting example, a spreadsheet may determine the Valuation of the domain name by using any combination of software modules described above to store, calculate and execute the following valuation-determining algorithm:

stored in the "Domain" column of the spreadsheet and/or data field of data storage 230 respectively.

The column and/or data field for "TLD" may calculate and/or store a determination of the top level domain associated with the domain name. As non-limiting examples planets.com, guns.com, whatever.com and witchcraft.com would all have "com" calculated and/or stored in the "TLD" column of the spreadsheet and/or data field of data storage 230 respectively.

The column and/or data field for "com available" may calculate and/or store a determination of whether the .com TLD for a particular domain name is available. This determination can be calculated and/or stored as a TRUE/FALSE value, or possibly numerically as a 1 or 0. As non-limiting examples onlinelampguide.com and finnishfelines.com may both be domain names available with a .com TLD, and thus would have a number 1 or a value of TRUE calculated and/or stored in the "com_available" column of the spreadsheet and/or data field of data storage 230, while the other domain names listed above would have a number 0 or a value of FALSE calculated and/or stored in the "com_available" column of the spreadsheet and/or data field of data storage 230.

The column and/or data field for "tld multiplier" may calculate and/or store a multiplier based on the TLD associated with the domain name. In one non-limiting example embodiment, this multiplier will always be less than 1 for TLDs other than .com. A non-limiting example formula or algorithm may be used to determine the multiplier as follows:

$$=IF(tld="com",1,IF(tld="org",0.08,IF(tld="net",0.1, IF(tld="ca",0.12,IF(tld="us",0.015)))))$$

Thus, if the TLD stored in the TLD column and/or data field is "com", then a value of 1 may be calculated and/or stored in the "tld_multiplier" column of the spreadsheet and/or data field of data storage 230. If the TLD stored in the TLD column is "org", then a value of 0.08 may be calculated and/or stored in the "tld_multiplier" column of the spreadsheet and/or data field of data storage 230. If the TLD stored in the TLD column is "net", then a value of 0.1 may be calculated and/or stored in the "tld_multiplier" column of the spreadsheet and/or data field of data storage 230. If the TLD stored in the TLD column is "ca", then a value of 0.12 may be calculated and/or stored in the "tld_multiplier" column of the spreadsheet and/

$$=IF(IF(AND(Popularity<15,com\_available=1),0,SUM(Precision:PPC)*(IF(AND(words=1,WT>250),25,IF(WT>250,15,6))*tld\_multiplier*dash\_multiplier))<10,0,IF(AND(Popularity<15,com\_available=1),0,SUM(Precision:PPC)*(IF(AND(words=1,WT>250),25,IF(WT>250,15,6))*tld\_multiplier*dash\_multiplier)))$$

In this non-limiting example, the spreadsheet may have columns, and/or data storage 230 may have a data field for each of the valuation-determining elements, and may have an additional column and/or data field to store the calculated Valuation of the domain name. In other embodiments, each of the valuation-determining elements, as well as the calculated Valuation of the domain name may be calculated and/or stored in data fields in data storage 230. The valuation-determining elements may include, but are not limited to, "Domain," "TLD," "com_available," "tld_multiplier," "dashes" and "dash_multiplier."

The column and/or data field for "Domain" may calculate and/or store a determination of the domain name without its associated TLD. As non-limiting examples planets.com, guns.com, whatever.com and witchcraft.com would have "planets," "guns," "whatever" and "witchcraft" calculated and/or or data field of data storage 230. If the TLD stored in the TLD column is "us", then a value of 0.15 may be calculated and/or stored in the "tld_multiplier" column of the spreadsheet and/or data field of data storage 230.

As non-limiting examples masks.org would have a value of 0.08 calculated and/or stored in the "tld_multiplier" column of the spreadsheet and/or data field of data storage 230, fuel.net would have a value of 0.1 calculated and/or stored in the "tld_multiplier" column of the spreadsheet and/or data field of data storage 230, america.us would have a value of 0.015 calculated and/or stored in the "tld_multiplier" column of the spreadsheet and/or data field of data storage 230, while the other domain names listed above would have a value of 1 calculated and/or stored in the "tld_multiplier" column of the spreadsheet and/or data field of data storage 230.

No limitations should be placed on how the multiplier for a particular domain name is determined. As a non-limiting example, to come up with the value of that same domain name for other TLDs, a multiplier may be based on comparable sales or sometimes simply intuition. In one non-limiting example embodiment, a dynamic multiplier may be created based on registration statistics per each TLD. This embodiment may give a very accurate measure of domain scarcity, thus indicating for domain name appraisal purposes relatively how rare a domain is. When doing this domain evaluation the standard may be to evaluate a name for the .com TLD and then apply a multiplier (always less than 1) to come up with the value of that same name in other TLDs. In another embodiment, the .com top level domain may be used as a baseline multiplier and each additional top level domain may be assigned a multiplier less than the baseline multiplier, but proportional to the number of registrations for that top level domain name in comparison to .com domains.

As non-limiting examples, using the embodiment using the registration statistics per each TLD, the registrations may use registration data to determine the following example registration statistics: COM-80,451,101, NET-12,227,350, ORG-7,541,738, INFO-5,134,461, BIZ-2,014,553, US-1,557,592, MOBI-836,345. Using these statistics, the following multipliers may be determined by comparing the proportional registrations of other TLDs to .com TLD registrations: com=1, net=0.15, org=0.09, info=0.06, biz=0.02, us=0.01, mobi=0.009. It should be noted that the dynamic top level domain multiplier in this example is based on registration statistics for each of a plurality of top level domains, .com top level domains being assigned a multiplier of 1 and each additional top level domain being assigned a multiplier of less than 1 proportional to the number of registrations for that top level domain name as compared to the .com domains.

Thus, using the example multipliers based on registration statistics, the following example appraisals may be made (possibly using a software module executed on a server and configured to create and apply a top level domain multiplier comprising registration statistics) based on the multiplier for the domain "play": play.com=$100,000, play.net=$15,000, play.org=$9,000, play.info=$6,000, play.biz=$2,000, play.us=$1,000, play.mobi=$900. These figures may be calculated by applying the top level domain multiplier to the certified domain name appraisal process by multiplying the dynamic top level domain multiplier by the appraisal and/or valuation of the domain name.

The column and/or data field for "dashes" may calculate and/or store a determination of whether the domain name and/or any keywords in the domain name contain dashes. This determination can be calculated and/or stored as a TRUE/FALSE value, or possibly numerically as a 1 or 0. As non-limiting examples any-cell.com contains dashes, and thus would have a number 1 or a value of TRUE calculated and/or stored in the "dashes" column of the spreadsheet and/or data field of data storage 230, while the other domain names listed above would have a number 0 or a value of FALSE calculated and/or stored in the "dashes" column of the spreadsheet and/or data field of data storage 230.

The column and/or data field for "dash_multiplier" may calculate and/or store a multiplier based on whether the domain name contains dashes, as determined by the "dashes" column and/or data field. A non-limiting example formula or algorithm may be used to determine the multiplier as follows:

$$=IF(\text{dashes}=0,1,IF(\text{dashes}=(\text{words}-1),0.1,0.01))$$

Thus, if the value stored in the dashes column and/or data field is 0 (or FALSE), then a value of 1 may be calculated and/or stored in the "dash_multiplier" column of the spreadsheet and/or data field of data storage 230. If the total of 1 minus the value in the "words" column and/or data field (previously disclosed) is the same as the value stored in the "dashes" column or data field, then a value of 0.1 may be calculated and/or stored in the "dash_multiplier" column of the spreadsheet and/or data field of data storage 230, otherwise, a value of 0.01 may be calculated and/or stored in the "dash_multiplier" column of the spreadsheet and/or data field of data storage 230.

As non-limiting examples any-cell.com would have a value of 0.1 calculated and/or stored in the "dash_multiplier" column of the spreadsheet and/or data field of data storage 230, while the other domain names listed above would have a value of 1 calculated and/or stored in the "dash_multiplier" column of the spreadsheet and/or data field of data storage 230.

After the valuation-determining elements are calculated and/or stored, the valuation-determining algorithm may then evaluate and use any combination of the valuation-determining elements or other disclosed elements to calculate and/or store the Valuation of the domain name. The value assigned to a particular valuation-determining element may increase or decrease the value of the Valuation of the domain name, and in turn may increase or decrease the appraisal of the domain name itself.

$$=IF(IF(AND(Popularity<15,com\_available=1),0,SUM(Precision:PPC)*(IF(AND(words=1,WT>250),25,IF(WT>250,15,6))*tld\_multiplier*dash\_multiplier))<10,0,IF(AND(Popularity<15,com\_available=1),0,SUM(Precision:PPC)*(IF(AND(words=1,WT>250),25,IF(WT>250,15,6))*tld\_multiplier*dash\_multiplier)))$$

To fully understand this example algorithm, it is important to break the algorithm into smaller component parts. A smaller example algorithm is being evaluated to determine if it is less than or greater than 10. If the result of this smaller example algorithm is less than 10, the value of the Valuation is 0, otherwise the value of the Valuation is the result of the smaller example algorithm. The smaller algorithm is as follows:

$$IF(AND(Popularity<15,com\_available=1),0,SUM(Precision:PPC)*(IF(AND(words=1,WT>250),25,IF(WT>250,15,6))*tld\_multiplier*dash\_multiplier))$$

The value assigned to the "Popularity" valuation-determining element (itself calculated using the popularity-determining elements) may be evaluated by the valuation-determining algorithm to determine the value assigned to the popularity of the domain name. The value assigned to the "com available" valuation-determining element may also be evaluated by the valuation-determining algorithm to determine whether the .com TLD for a particular domain name is available. In the non-limiting example algorithm above, if the "Popularity" data field has a value of less than 15, and the com available data field has a value of 1 (or TRUE), the total value of the smaller example algorithm may be assigned a value of 0, which would in turn cause the Valuation of the domain name to be 0, since the result of the smaller example algorithm is less than 10. Thus, the valuation-determining algorithm may increase or reduce the Valuation of the domain name, and by extension, the appraisal of the domain name, depending on whether the Popularity valuation-determining element is greater than 15 and whether the .com TLD for the domain name is available, Popularity greater than 15 and non-available .com domain names being preferable.

If the Popularity of the domain name is greater than 15 and/or the .com TLD for the domain name is not available, the total value of the smaller example algorithm may be determined by multiplying 4 multiplicands. Again, it is helpful to break this smaller example algorithm into smaller component parts to better understand it. In the smaller example algorithm, the first multiplicand is the sum of the Precision and the PPC valuation-determining elements.

The second multiplicand is determined by evaluating the following formula/algorithm: IF(AND(words=1,WT>250), 25,IF(WT>250,15,6) In this formula/algorithm, the value assigned to the words valuation-determining element may be evaluated to determine whether the value is 1. The value assigned to the metric for estimated searches per month (WT in the example algorithm) may also be evaluated to determine if the value is greater than 250. If the words element value is 1 and the estimated searches per month value is greater than 250, then the value assigned to the second multiplicand would be 25, otherwise, the value assigned to the second multiplicand would be determined by again evaluating the value assigned to the metric for the estimated searches per month (WT in this example).

If this value is greater than 250, the value assigned to the second multiplicand would be 15; otherwise the value assigned to the second multiplicand would be 6. The third and fourth multiplicands are the values of the valuation-determining elements calculated and/or stored in the tld_multiplier and dash_multiplier columns and/or data fields respectively.

As non-limiting examples and using the algorithms described in detail above, planets.com may be found to have a Precision, Popularity, Presence, Pattern and PPC of 600, 22877, 1000, 2015 and 241 respectively. Using the formulas above, planets.com would have a Valuation of $668,320.00.

FIG. 8 shows an example interface using the disclosed structure that may be used for displaying the progress of the domain spinning to allow the domain names to be displayed to the user. Likewise, FIG. 8 shows the appraisal and/or valuation of the domain name which may be displayed to a user on a user interface on a client.

The additional steps included in the embodiments illustrated in FIG. 1-8 are not limited to the embodiment shown in FIG. 1, FIG. 7, or their respective illustrated embodiments, and may be combined in several different orders and modified within multiple other disclosed embodiments. Likewise, the method steps disclosed herein may be accomplished by a software module executed on a server and/or client configured to accomplish that method step.

A Method and System for Word Splitting

Several different methods may be used to provide and manage the disclosed invention. In an example embodiment illustrated in FIG. 9, a user may enter a string of characters into a user interface as a word splitting input on a client computer 220, possibly seeking more information about a domain name, a spell check database, a search engine suggestion algorithm or any other use for word splitting (Step 900). The interface may also present the user with the option to choose the number of results to be displayed to the user on the interface on the client from the entered character string (Step 900). Any combination of software modules used together with hardware on a server computer 210 in a data center 240/250, as seen in FIG. 2 and described in detail herein, may receive and analyze the submitted word splitting input, possibly supplemented with additional information from data storage 230 within the data center 240/250.

One or more software modules may use this analysis to create a cached micro-dictionary comprising a plurality of micro-dictionary words from the character string (Step 910). This cached micro-dictionary may be used both to store words derived from the character string as well as compare words within the character string, keyword list, etc. with existing words in the cached micro-dictionary. The count of micro-dictionary words within the cached micro-dictionary may be used to establish a loop count, where the loop count is used to begin each pass through a micro-dictionary loop with a different micro-dictionary word as the first to be used (Step 910).

This cached micro-dictionary and character string may be passed into an algorithm calculated within one or more software modules executed on a communicatively-coupled server computer 210 and/or client computer 220. This algorithm may be used to find the largest contiguous word (Step 920) from the string. For each pass through the micro-dictionary loop, a determination may be made as to whether characters still remain in the character string. If so, the steps described in detail below for finding the largest contiguous word, including passing in the character string and the loop count, may be repeated until no characters remain. When it is determined that no characters remain, another iteration of the loop count may begin, where, when the micro-dictionary loop loops back for a new loop count, the new pass begins with a different micro-dictionary word as the first to be used (Step 910).

For each iteration prior to determining whether characters remain, a three step process may be observed: the largest contiguous word may be found, as detailed herein, the largest contiguous word may be removed from the character string and the largest contiguous word may be added to and stored in a keyword list with the beginning character position (Step 920).

Duplicate words may be removed, a plurality of reliability scores for a plurality of keyword strings from the keyword list may be calculated and the keywords may be reordered by character position (Step 930). Keyword strings and reliability scores may then be returned to the user via an interface on the client computer 220 and the keyword strings and reliability scores may be calculated, returned and displayed to the user on the client interface, possibly based on reliability factors, discussed in detail below (Step 940).

The software modules used in the context of the current invention may be stored in the memory of—and run on—at least one server 210 or client 220. As a non-limiting example of such software modules, one or more word splitting software modules may be used to split the character string into a plurality of keywords and determine, according to information stored in data storage 230 such as a dictionary database, whether words from the dictionary database are found within the character sting (or smaller contiguous strings when finding the largest contiguous word to create keyword strings) for possible purposes of seeking more information about a domain name, a spell check database, a search engine suggestion algorithm or any other use for word splitting.

One or more reliability score software modules may likewise be used to calculate a reliability score for each of one or more word splits derived from the word splitting input and/or character string, etc. The software modules may comprise software and/or scripts containing instructions that, when executed by a microprocessor on a server computer 210 or client computer 220, cause the microprocessor to accomplish the purpose of the module or the methods disclosed herein, in this example to create one or more splits in a character string input as a word splitting input or calculate a reliability score for each of one or more word splits derived from the word splitting input and/or display this information to the user on an interface on the client computer 220.

Figure 10:
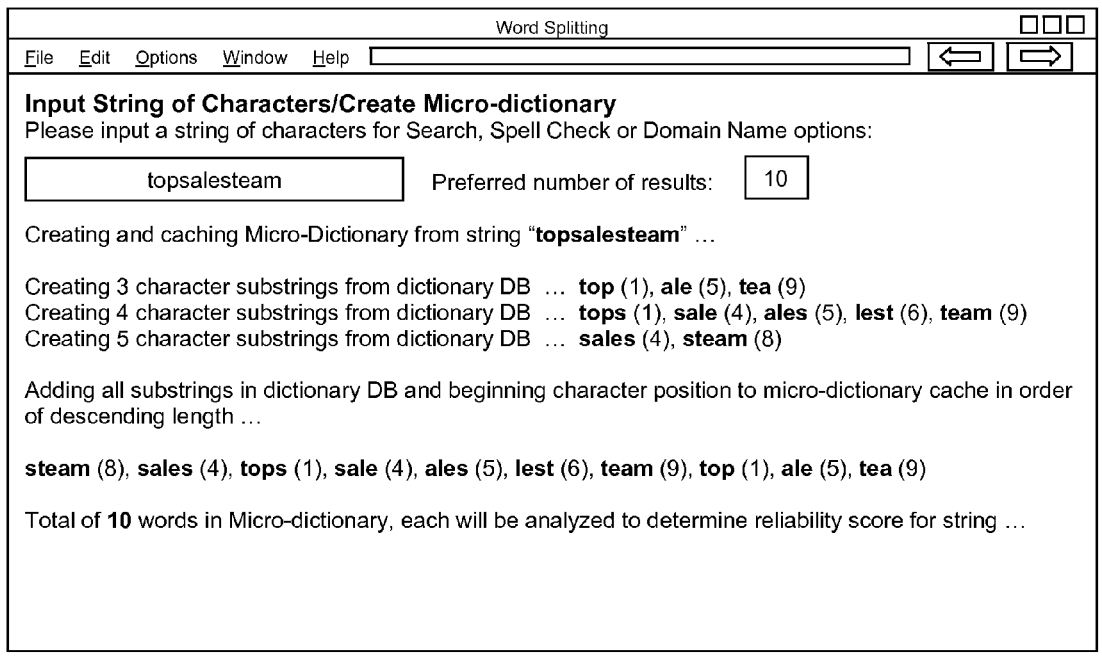
FIG. 10 illustrates a possible embodiment of an interface for inputting a character string and creating a micro-dictionary.

FIG. 10 shows an example interface using the disclosed structure that may be used for receiving one or more character strings and optionally the number of results to be displayed (Step 900). In this non-limiting example the user has entered the character string "topsalesteam." The user in this example has also elected to receive 10 results from this string, if available.

Figure 9:
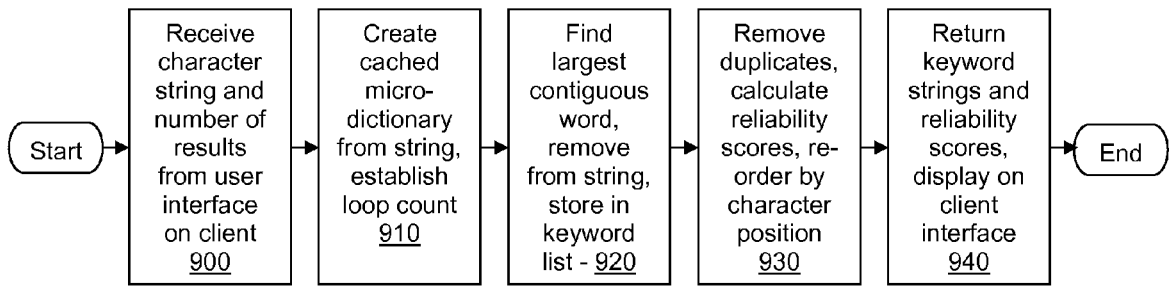
FIG. 9 is a flow diagram illustrating a possible embodiment of a method for word splitting.
Figure 11:
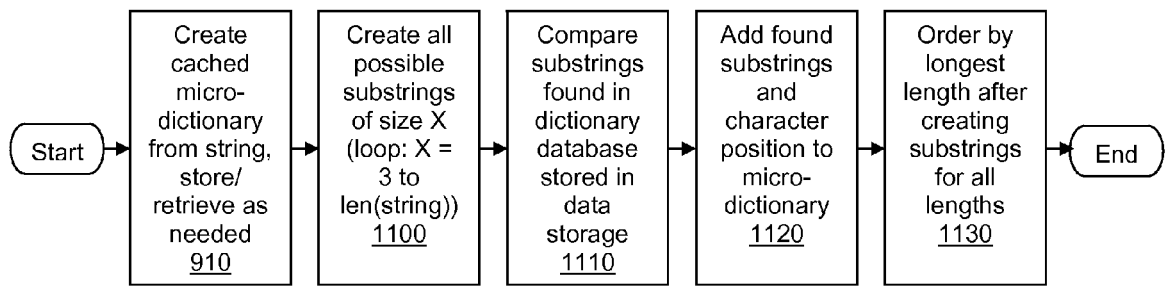
FIG. 11 is a flow diagram illustrating a possible embodiment of a method for word splitting.

FIG. 11 shows that the embodiment illustrated in FIG. 9, as well as other disclosed embodiments, may include the step of creating all possible substrings of size X from the character string where X is part of a loop with X=3 on the first iteration and incrementing by 1 on each iteration of the loop until X=len(string) or the total length of the character string (Step 1100). In other words, a variable may be established for a substring length, wherein an assigned value for the variable begins at 3.

One or more software modules may be used to generate all possible variations of one or more substrings of the character string, where the one or more substrings equal the length of the variable X established. Each of these one or more substrings created or generated may then be compared to words found in a dictionary database, possibly stored in data storage 230 (Step 1110). Those of the one or more substrings found in the dictionary database, along with a beginning character position for each of the one or more substrings, may be added to the micro-dictionary as micro-dictionary words (Step 1120). The substrings found in the dictionary database may be sorted, ranked, ordered and/or displayed in descending order according to length, so that the substring found with the longest length is sorted, ranked, ordered and/or displayed first, the next longest substring is sorted, ranked, ordered and/or displayed next and so on (Step 1130).

For each iterations from the step of establishing the variable through adding the one or more substrings found to the micro-dictionary ordered by length of the substring, the variable may be incremented by one until the variable is equal to the length of the character string. Once the loop has completed, a determination may be made as to the number of substrings added to the micro-dictionary as micro-dictionary words. This number of micro-dictionary words stored in the cached micro-dictionary may be used to establish a loop count, used by other software modules and methods disclosed herein.

In the non-limiting example embodiment shown in FIG. 10, one or more software modules on one or more server or client computers 210/220 may begin a loop within the step of creating a micro-dictionary based on the input character string "topsalesteam" (Step 1100). The loop may begin by setting a variable for the length of the substring to 3 to be compared to a dictionary database. For each iteration through the loop, the variable, and thus the number of characters to be compared, may be incremented, continuing through 4-character substrings, 5-character substrings, etc., until it has exhausted all possibilities through the total length of the character string "topsalesteam," which is 12 characters in length.

Each of the substrings from the character string "topsalesteam" may then be compared to words and/or substrings found in a dictionary database, possibly stored in data storage 230 (Step 1110). In the non-limiting example embodiment shown in FIG. 10, the one or more software modules may compare all 3-character strings found in "topsalesteam" to the dictionary database to create and compare to a dictionary database to determine that 3-character substrings "top," "ale" and "tea" are found in the dictionary database. The one or more software modules may then increment the number of characters in the substring by one each time through the loop and repeat the process, so that the character substrings "tops," "sale," "ales," "lest" and "team" are created, compared and found in the dictionary database for 4-character substrings and "sales" and "steam" are created, compared and found in the dictionary database for 5-character substrings.

These substrings for 3, 4 and 5-character substrings may then be added, along with their respective character positions in the original character string "topsalesteam," (seen in parentheses in FIG. 10) to the micro-dictionary (Step 1120). The substrings found in the dictionary database may then be ordered according to descending length, so that the substring found with the longest length is sorted, ordered, ranked and/or displayed first, the next longest substring is sorted, ordered, ranked and/or displayed next and so on (Step 1130). In the non-limiting example embodiment seen in FIG. 10, the substring "steam" beginning at position (8) and "sales" found at position (4) are both 5 characters in length, so are listed first. 4-character substrings "tops (1)," "sale (4)," "ales (5)," "lest (6)" and "team (9)" are listed next, and 3-character substrings "top (1)," "ale (5)" and "tea (9)" are listed last.

Figure 12:
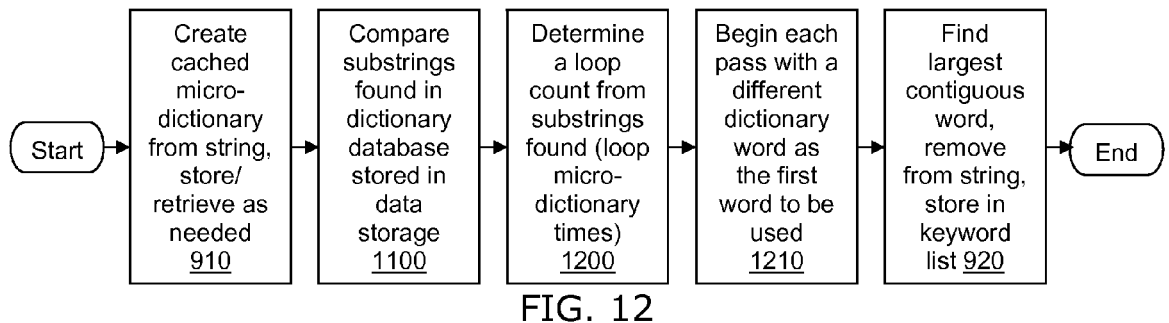
FIG. 12 is a flow diagram illustrating a possible embodiment of a method for word splitting.

FIG. 12 shows that the embodiment illustrated in FIG. 9, as well as other disclosed embodiments, may include the step of determining and establishing a loop count based on the substrings found and added to the micro-dictionary (Step 1200). The purpose of the loop count is to begin each pass with a different substring/micro-dictionary word as the first to be used, thus the loop count will be a count of substrings/micro-dictionary words found and added to the micro-dictionary (Step 1210). This loop count may be passed in, along with the character string, cached micro-dictionary words/substrings and/or positions of characters, via one or more modules on a communicatively coupled server computer 210 or computer client 220, which may then be used to find the largest contiguous word (Step 920). The non-limiting example embodiment shown in FIG. 10 shows that a total of 10 words are found in the micro-dictionary, so 10 loops will be included in the loop count to pass a different substring/dictionary word for each word in the micro-dictionary.

Figure 13:
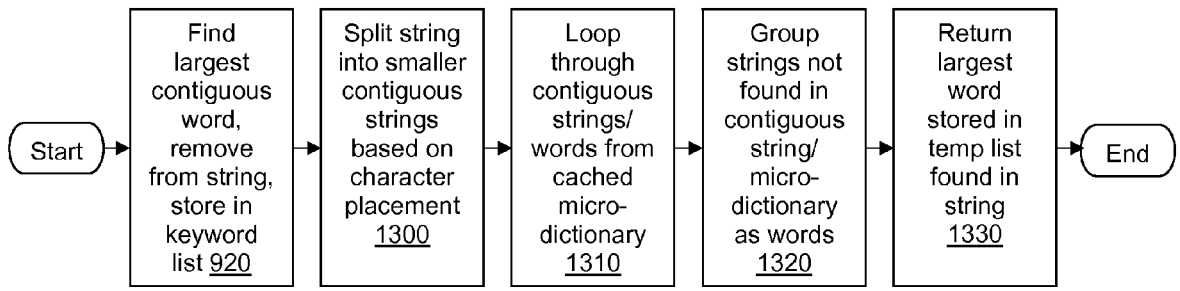
FIG. 13 is a flow diagram illustrating a possible embodiment of a method for word splitting.
Figure 14:
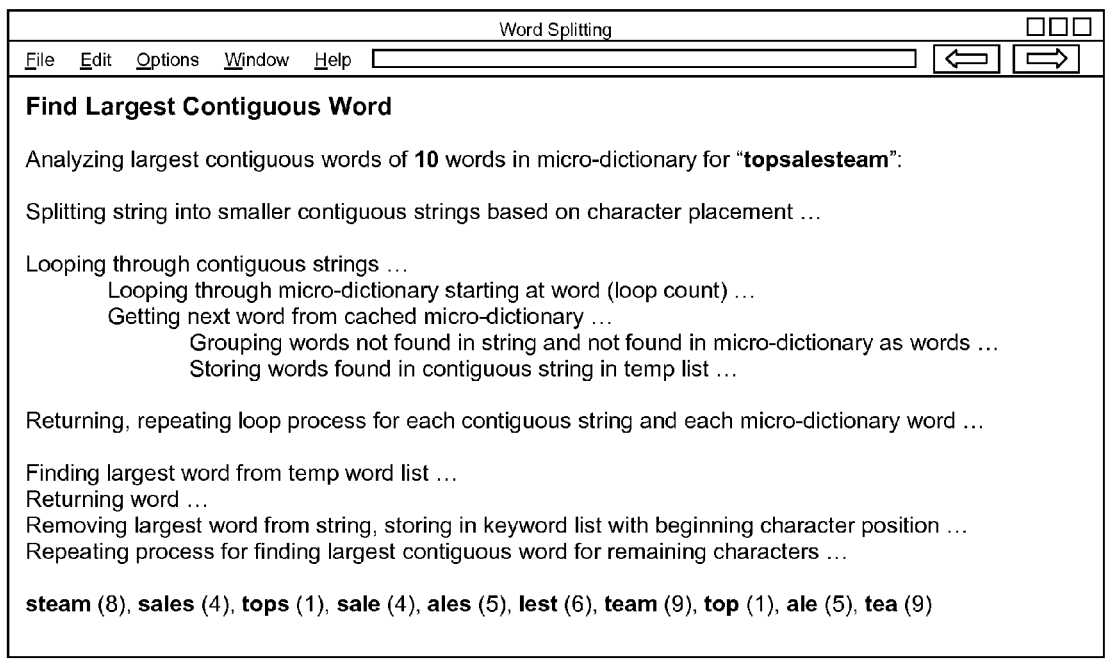
FIG. 14 illustrates a possible embodiment of an interface for finding a largest contiguous word.

FIG. 13, as well as a non-limiting example embodiment shown in FIG. 14, show that the embodiment illustrated in FIG. 9, as well as other disclosed embodiments, may include, as steps in finding the largest contiguous string (Step 920), the steps of splitting the character string into a plurality of smaller contiguous strings based on character placement (Step 1300), looping through an "outer loop" comprising each of the plurality of smaller contiguous strings and/or words from the cached micro-dictionary (Step 1310), grouping strings not found in the contiguous string and/or micro-dictionary as words (Step 1320), and returning the largest word stored in the temp list found in contiguous string (Step 1330).

FIG. 14 shows an example interface using the disclosed structure that may be used for finding the largest contiguous word (Step 920), as well as the additional steps shown in FIGS. 13-17. In this non-limiting example, 10 words have been added to the micro-dictionary based on the character string "topsalesteam." These 10 words derived from the character string may be used to establish a loop count (Step 1200), which may in turn be used to find the largest contiguous word (Step 920). As seen in FIGS. 13 and 14, the string may be split into smaller contiguous strings based on character placement (Step 1300) and the algorithm may loop through the contiguous strings.

In one embodiment seen in FIG. 14, finding the largest contiguous word (Step 920) may include the steps of passing the character string, and the loop count established from the plurality of micro-dictionary words, into an algorithm used to find the largest contiguous word (Step 920), splitting the character string into a plurality of smaller contiguous strings based on character placement (Step 1300), and creating an "outer loop" comprising a loop through each of the plurality of smaller contiguous strings (Step 1310).

In addition to the "outer loop" used by the algorithm to loop through contiguous strings, the algorithm may also loop through words from the cached micro-dictionary (Step 1500). In certain embodiments, this second "inner loop" may also be established, comprising a loop through each of the plurality of micro-dictionary words for each "outer loop" through each of the plurality of smaller contiguous strings (Step 1310).

Figure 15:
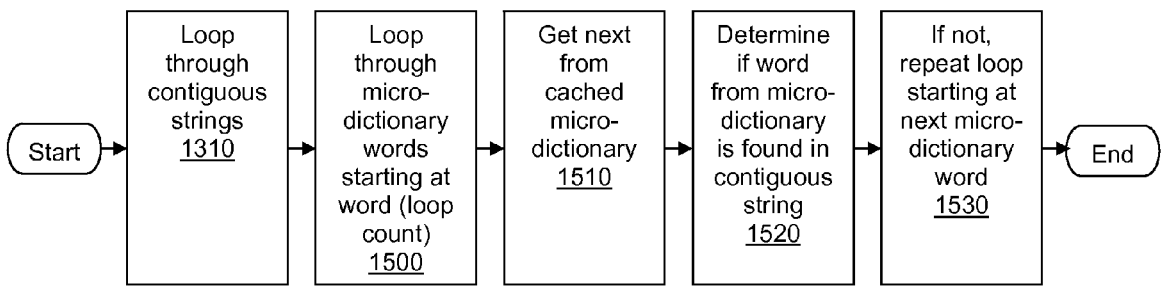
FIG. 15 is a flow diagram illustrating a possible embodiment of a method for word splitting.

FIG. 15 shows that the embodiment illustrated in FIGS. 13 and 14, as well as other disclosed embodiments, may include the steps of looping through this "inner loop" of the micro-dictionary words starting at the word found at the loop count at the current iteration of the loop (Step 1500), getting each of the next words from the cached micro-dictionary at each subsequent iteration of the loop (Step 1510) and determining if the word from the micro-dictionary is found in the contiguous string in the current iteration of the outer loop (Step 1520). If the word from the micro-dictionary is not found in the contiguous string (Step 1520), the loop may be repeated starting at the next micro-dictionary word.

Put another way, this "inner loop" may further include the steps of looping through each of the plurality of micro-dictionary words, in order of and encompassing each word in the loop count (Step 1500), and, for each of the plurality of micro-dictionary words in the inner loop (Step 1510), determining if the micro-dictionary word is found in each of the plurality of smaller contiguous strings (Step 1520).

As shown in FIG. 14, the string "topsalesteam" may be analyzed and split into smaller contiguous strings based on character placement (Step 1300). A loop through each of the contiguous strings from "topsalesteam" may be established, and for each of these contiguous strings, each word in the micro-dictionary may be compared with each of the contiguous strings to determine if the word is found in the current contiguous string (Steps 1500-1530). In addition, a determination may be made that the contiguous string is not found in the micro-dictionary, the string may be grouped as a word and the string grouped as a word may be stored in a temp list. The outer loop through the contiguous strings may then be continued.

Figure 16:
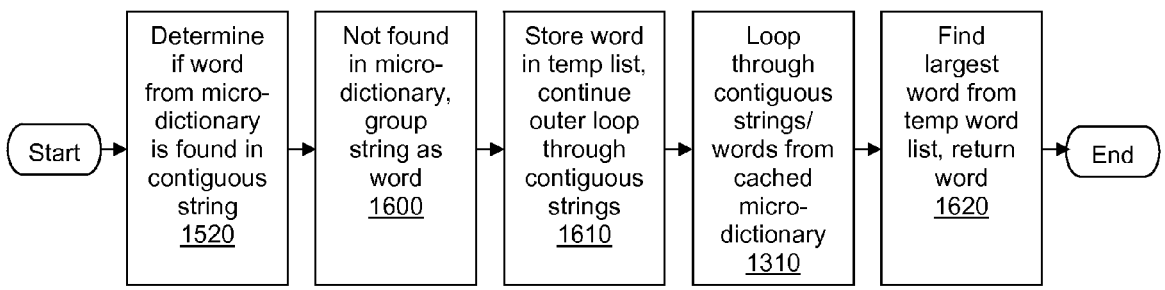
FIG. 16 is a flow diagram illustrating a possible embodiment of a method for word splitting.

Specifically, FIGS. 14 and 16 show that the embodiment illustrated in FIGS. 13-15, as well as other disclosed embodiments, may include the steps of, if the word in the current inner loop iteration of the micro-dictionary is not found in the contiguous string of the current loop iteration of the outer loop (Step 1520), a determination may be made that the word is not found in the micro-dictionary, and the string may be grouped as a word (Step 1600). This word may then be stored in a temporary list, and the outer loop through the list of contiguous strings may continue (Step 1610, 1310). Ultimately the largest word from the temp list may be found and returned (Step 1620).

Put another way, if one of the plurality of the micro-dictionary words is not found in one of the smaller contiguous strings (Step 1600), a determination may be made that the smaller contiguous string is not found in the micro-dictionary (Step 1610), the loop count may be incremented by one, and a determination may be made if the micro-dictionary word next in the micro-dictionary is found in the one of the plurality of smaller contiguous strings (Step 1310).

Figure 17:
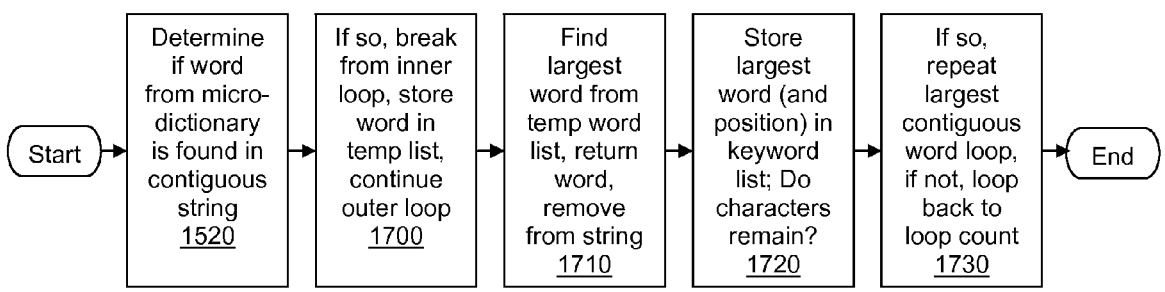
FIG. 17 is a flow diagram illustrating a possible embodiment of a method for word splitting.

FIGS. 14 and 17 show that the embodiments illustrated in FIGS. 13-16, as well as other disclosed embodiments, may include the steps of, if the current word from the inner loop through the micro-dictionary is found in the current contiguous string from the outer loop through the contiguous strings (Step 1520), breaking from the inner loop through the micro-dictionary words, storing the word in a temp list and continuing the outer loop through the contiguous strings (Step 1700). This largest word from the temp word list, prior to being removed, may be stored, along with the its position in the string, in a keyword list, and a determination may be made as to whether characters remain in the string (Step 1720).

Put another way, for each of one or more contiguous strings not found in the micro-dictionary, the one or more smaller contiguous strings not found in the micro-dictionary may be grouped as words, where the plurality of smaller contiguous strings may be grouped as one or more temporary words, and may be stored in the temporary list while the outer loop may be continued (Step 1700).

The largest word from the temporary word list may be found, returned and removed from the string; In other words, finding the largest of the one or more temporary words and returning the largest of the one or more temporary words found from the temporary word list to be stored in the keyword list with its beginning character position (Step 1710-1720).

If characters remain (Step 1720), the steps to find the largest contiguous word, represented by FIGS. 13-17 may be repeated for each iteration of the words used to determine the loop count (Step 1730). If characters remain in the current iteration of the micro-dictionary loop, finding a next largest contiguous word. Put another way, if additional characters remain (Step 1720), the process may be repeated, beginning with finding the largest contiguous word (passing in the current loop count) and removing the largest word from the string and storing in the keyword list (Step 1700-1720). This process may be repeated until no characters remain.

If characters do not remain (Step 1720), the process loops back to the next count in the loop count, and repeats finding the largest contiguous word (passing in the loop count), removes the largest word from the string with beginning character position and stores the word in the keyword list (Step 1730). Put another way, if characters remain in the current iteration of the micro-dictionary loop, finding a next largest contiguous word, and if no characters remain in the current iteration of the micro-dictionary loop, incrementing the loop count and continuing the micro-dictionary loop with a next dictionary word in the loop count as the first to be used (Step 1720-1730).

Figure 18:
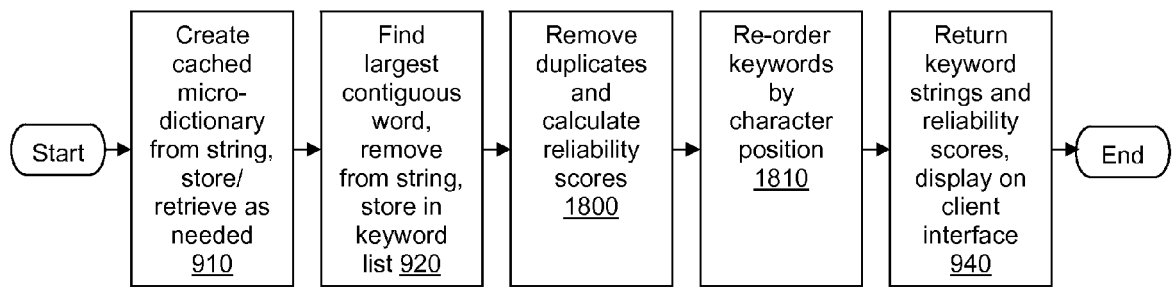
FIG. 18 is a flow diagram illustrating a possible embodiment of a method for word splitting.
Figure 19:
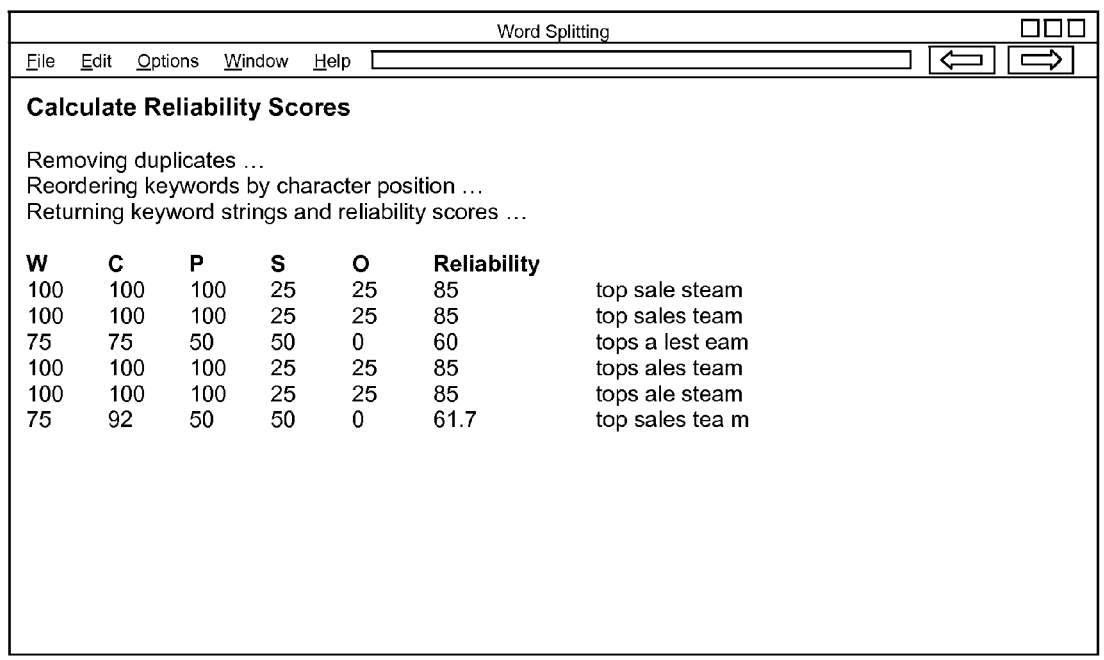
FIG. 19 illustrates a possible embodiment of an interface for calculating and displaying reliability scores.

Once the process has run through the number of times for the loop count, duplicate words may be removed, and reliability scores may be calculated. FIGS. 18 and 19 show that the embodiment illustrated in FIG. 9, as well as other disclosed embodiments, may include the steps of removing duplicates and calculating reliability scores (Step 1800). Keywords may then be re-ordered by character position (Step 1810). Put another way, on completing the micro-dictionary loop, one or more duplicate words may be removed from the keyword list, and the plurality of keyword strings may be re-ordered by character position (Step 1800-1810).

A Method and System for Calculating a Reliability Score

Calculating the reliability score may include consideration of variables (represented below as W, C, P, S and O reliability variables) within an algorithm executed by the appropriate software modules. The reliability score may be determined by manipulating these variables in a preset reliability formula. Any combination of software modules used together with hardware on a client computer 220 or server computer 230 in a data center 240/250, as illustrated in FIG. 2, and described in detail herein, may receive and analyze the submitted information, possibly a word splitting character string input, from a user interface on a client computer 220, possibly supplemented by additional information from data storage 230 within one or more data centers 240/250. The software modules, possibly including one or more word splitting software modules, may use this analysis to create an automated reliability score of the character string used as a domain name, spell check, search engine etc. possibly using a reliability score algorithm, the reliability score algorithm possibly contained within one or more reliability score software modules.

Figure 20:
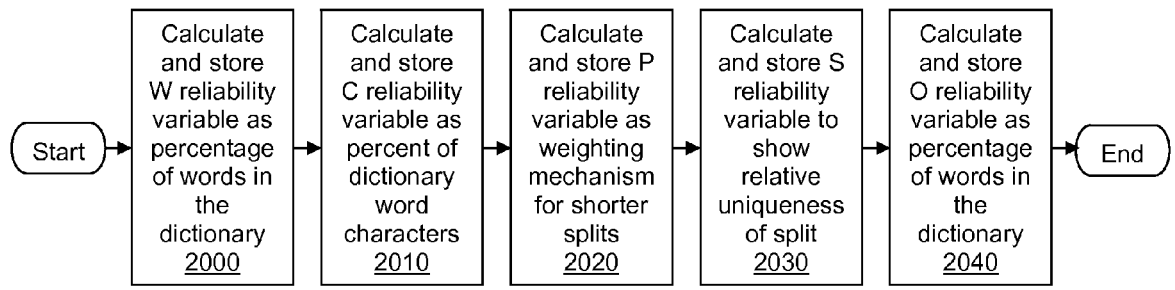
FIG. 20 is a flow diagram illustrating a possible embodiment of a method for calculating and displaying reliability scores.

The reliability score may be calculated and determined, as seen in FIGS. 19 and 20, by dividing the character string into one or more word splits, and calculating a reliability score for each of the one or more words splits derived from the word splitting input character string. The reliability score may be divided into and evaluated by four or five logical groupings, including evaluation of the W, C, S, P and O reliability variables related to the received character string, described in detail below.

The first reliability variable, or "W" reliability variable, may compare a plurality of keywords derived from each of the one or more word splits with a plurality of dictionary words in a dictionary database to determine a percentage of the plurality of keywords found in the dictionary database (Step 2000). In other words, determination of the W reliability variable may include evaluating the percentage of words found in the dictionary database. An algorithm to determine the W reliability variable may be established, stored and/or contained within one or more software modules. Such algorithms and software modules may be stored and executed within an environment in a data center 240/250 using any combination of a server 210, client 220 and data storage 230, any or all of which may be communicatively coupled to a network 200. The result of the calculations for the W reliability variable may be stored in data storage 230.

The next reliability variable or "C" reliability variable may include the percentage of characters in the dictionary words (Step 2010). In other words, for each of the one or more word splits, a percentage of characters in the plurality of keywords found in the dictionary database may be evaluated and determined. An algorithm to determine the C reliability variable may be established, stored and/or contained within one or more software modules in a similar manner to the W reliability variable as described herein.

In a non-limiting example to demonstrate evaluation and determination of the W and C reliability variables, a user may enter the character string "meandmykid." The input character string may be evaluated according to the methods disclosed herein and displayed on a user interface similar to that seen in FIG. 19. Using the methods disclosed above, the following reliability scores may be returned:

| W | C | P | S | O | Reliability | |
|---|---|---|---|---|---|---|
| 67 | 70 | 100 | 100 | 0 | 70.5 | mean dmy kid |
| 100 | 100 | 50 | 100 | 100 | 90 | me and my kid |

In this non-limiting example, the words "mean" and "kid" were found in the dictionary database. However, "dmy," although grouped as a word, was not found in the dictionary database. Since only two words were recognized within the first word split as found in the dictionary database, only ⅔, or 67%, of the words were found in the dictionary database, and the "W" reliability variable is set at 67. Likewise, of the 10 letters in "meandmykid," only 7 total letters were found in words which were found in the dictionary database. Since 70% of the characters in the original string were found in words found in the dictionary database, and the "C" reliability variable is set at 70.

The "P" reliability variable may rank each of the one or more word splits based on how many of the plurality of keywords were derived from each of the one or more word splits (for example, 3 keywords may be a better split than 4). The P reliability variable may be used to counter-act the S score (described below) as a weighting mechanism geared towards shorter splits (Step 2020). An algorithm to determine the P reliability variable may be established, stored and/or contained within one or more software modules in a similar manner to the W reliability variable as described herein.

The rank for each of the one or more word splits may be higher according to fewer splits within each of the one or more word splits. Ranking each of the one or more word splits may further comprise generating a number for each of the one or more word splits representing a count of the number of keywords for each of the one or more word splits. Ranking each of the one or more word splits may further comprise using the number of keywords for each of the one or more word splits as a rank, where the lowest number of keywords is determined to be the highest rank. Determination of the P reliability variable may include the inverse of the rank of the number of keywords. A rank may then be determined by calculating a percentage derived from the inverse of the rank assigned to the number of keywords. The percentage may then be converted into a whole number to determine a final ranking score.

In a non-limiting example, a user may enter the character string "expertsexchange." The input character string may be evaluated according to the methods disclosed herein and displayed on a user interface similar to that seen in FIG. 19. Using the methods disclosed above, the following reliability scores may be returned:

| W | C | P | S | O | Reliability | |
|---|---|---|---|---|---|---|
| 100 | 100 | 100 | 100 | 33 | 93.3 | experts exchange |
| 100 | 100 | 50 | 50 | 33 | 78.3 | experts ex change |
| 100 | 100 | 50 | 50 | 33 | 78.3 | expert sex change |
| 75 | 93 | 33 | 50 | 0 | 58.4 | experts ex chang e |
| 75 | 93 | 33 | 50 | 0 | 58.4 | ex pert s exchange |

In this non-limiting example, a determination of how many keywords each split has may be made, and that number may then be ranked. This non-limiting example may better demonstrate the P variable, as there are three different possibilities for number of keywords, compared to two possibilities for keywords found in "topsalesteam:"

experts exchange: 2 keywords
experts ex change: 3 keywords
expert sex change: 3 keywords
experts ex chang e: 4 keywords
ex pert s exchange: 4 keywords This example shows that there are three different counts of keywords (2,3,4) amongst all of the splits, so we rank each one:

2 keywords=rank 1
3 keywords=rank 2
4 keywords=rank 3

The definition above states that the P reliability variable may include the inverse of the rank of the number of keywords or in other words, the P score is 1/rank so it this example may be evaluated as follows:

experts exchange: 1/1 (100%)
experts ex change: 1/2 (50%)
expert sex change: 1/2 (50%)
experts ex chang e: 1/3 (33%)
ex pert s exchange: 1/3 (33%)

So if the algorithm starts with assumption that shorter splits are more advantageous, then for each potential split, a number may be created representing the count of keywords for that split (2 for experts exchange, 3 for experts ex change, etc.). Using the number of keywords for each split as a rank, a rank may be established according to lowest number of keywords as highest/first rank (2 keywords=rank 1, 3 keywords=rank 2, etc.). The inverse of the rank may be used to determine a percentage, and the percentage may be represented as a whole number, which will be displayed as the final score.

The "S" variable may score a uniqueness of each of the one or more word splits (Step 2030). The S reliability variable may determine relative uniqueness of the split based on how many other splits contain the same number of words. An algorithm to determine the S reliability variable may be established, stored and/or contained within one or more software modules in a similar manner to the W reliability variable as described herein.

The uniqueness each of the one or more word splits may be higher if the one or more word splits has fewer splits. The uniqueness of each of the one or more word splits may determined by how many of the one or more word splits contain the same number of keywords. The uniqueness of each of the one or more word splits may be scored by calculating a percentage derived from the inverse of the number of the one or more word splits that produces that number of keywords. The percentage may be converted into a whole number to determine a final score.

In a non-limiting example, the input character string "topsalesteam" may be evaluated according to the methods disclosed herein and displayed on a user interface similar to that seen in FIG. 19. Using the methods disclosed above, the following reliability scores may be returned:

| W | C | P | S | O | Reliability | |
|---|---|---|---|---|---|---|
| 100 | 100 | 100 | 25 | 25 | 85 | top sale steam |
| 100 | 100 | 100 | 25 | 25 | 85 | top sales team |
| 75 | 75 | 50 | 50 | 0 | 60 | tops a lest eam |
| 100 | 100 | 100 | 25 | 25 | 85 | tops ales team |

-continued

| W | C | P | S | O | Reliability | |
|---|---|---|---|---|---|---|
| 100 | 100 | 100 | 25 | 25 | 85 | tops ale steam |
| 75 | 92 | 50 | 50 | 0 | 61.7 | top sales tea m |

In the topsalesteam example, there may be 6 potential splits; 4 of these splits may be three keywords long while the other 2 may be four keywords long. Given that knowledge, the six splits themselves may be considered and evaluated:

top sale steam: 3 keywords thus the S score is 1/4 (25%) since there are four total splits that produce 3 keywords.
top sales team: 3 keywords, S=25
tops a lest eam: 4 keywords so the S score is 1/2 (50%) as there are only two splits that have 4 keywords making those splits a bit more unique.
tops ales team: 3 keywords, S =25
tops ale steam: 3 keywords, S=25
top sales tea m: 4 keywords, S=50

So if the algorithm starts with the assumption that the fewer splits with that number of keywords, the more unique the split, the word splitting and reliability score algorithms may determine variations in the number of potential splits from the original string (6 potential variations in splits), determine the number of splits with the same number of keywords (4 are 3 words long, 2 are 4 keywords long) and determine that the S reliability variable may include the inverse of the number of other stings with the same number of keywords. The score may then be created by taking the inverse of the number of splits that produce those number of keywords, deriving a percentage as a whole number representing the final score. The number of strings with same number of splits get same score. The final score with the higher whole number represents greater uniqueness of the split. Therefore, the lower the number of splits with that number of keywords, the more unique the split.

The "O" reliability variable may weight the percentage of the plurality of keywords found in the dictionary database according to whether or not the percentage of the plurality of keywords found in the dictionary database is 100 (Step 2040). Determination of the O reliability variable may include a determination of whether W=100. If so, then O=100*1/count (keywords where W=100). If W is not 100, then O=0. Other evaluation elements described in detail below, may also be applied to the domain, spell check, search engine, etc. for the reliability score. An algorithm to determine the O reliability variable may be established, stored and/or contained within one or more software modules as described above regarding the W reliability variable. The results of this formula may be seen in the example results above for the strings "meandmykid," "topsalesteam" and "expertsexchange."

In other words, if this word split had a 100 value for the W reliability factor, then the O reliability would represent the percentage of all word splits generated that also have a 100 value for the W reliability factor.

Having established the 5 reliability variables, the reliability score for these and other character strings may be calculated using the following formula, the results of which are demonstrated in the example results above for the strings "meandmykid," "topsalesteam" and "expertsexchange:"

$$\text{Reliability} = ((W*5)+(C)+(P*2)+S+O)/10$$

In other words, the reliability score for each of the one or more word splits is calculated by multiplying the percentage of the plurality of keywords found in the dictionary database with a first multiplicand, the ranking of the one or more word splits is multiplied by a second mutliplicand, adding these products to the percentage of characters, the uniqueness of the one or more word splits and the rank of the one or more word splits, and dividing this sum by a divisor.

In the event that multiple splits have the same reliability score, an n-gram algorithm may be used by the one or more software modules as a sort of "tie-breaker" to determine which of the scores is in fact the most reliable. If a first plurality score for a first keyword string is the same as a second plurality score for a second keyword string, an n-gram score using an algorithm and a dataset may determine relative usage of keywords together with common language.

An n-gram may be defined as a subsequence of n items from a given sequence. In the context of the current invention, the "n" in n-gram may represent the number of words. n-gram models are used in various areas of statistical natural language processing and genetic sequence analysis. An n-gram model may be used in the context of the current invention to predict the most likely of the keyword strings with equal reliability scores to be desirable to the user. The statistical properties of n-grams may be used to determine the most desirable of the tied keyword strings.

The n-gram algorithm may be used as a secondary sort after the reliability scores are determined to determine the most reliability of a final keyword split. As a non-limiting example, because "topsalesteam" has 4 splits of 3 words each with equal reliability, each split may be passed into a 3-gram dataset with 4 different possibilities:
1) Top sale steam 3-gram score=0
2) top sales team 3-gram score=679
3) tops ales team 3-gram score=0
4) tops ale stream 3-gram score=0

In this example, the use of the n-gram algorithm shows that top sales team is the most reliable of those presented to the user on the interface on the client computer. The n-gram scores generated for this example are based on a sample n-gram where "top sales team" was the only word split found that was represented in the n-gram database.

Figure 21:
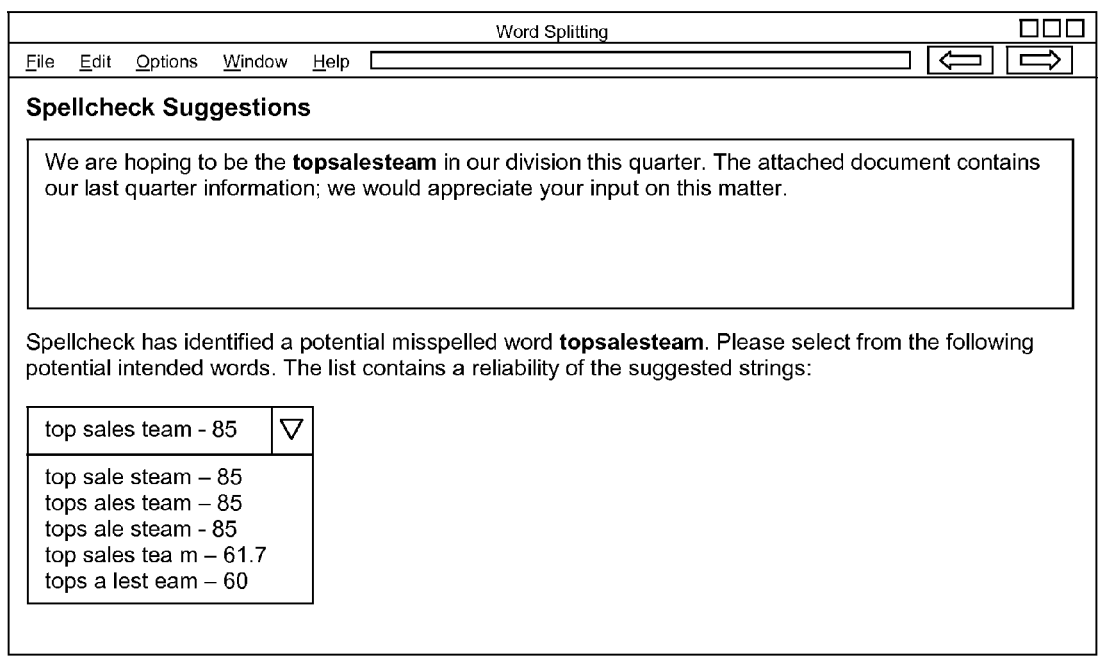
FIG. 21 illustrates a possible embodiment of an interface for calculating and displaying reliability scores in a spell check context.
Figure 22:
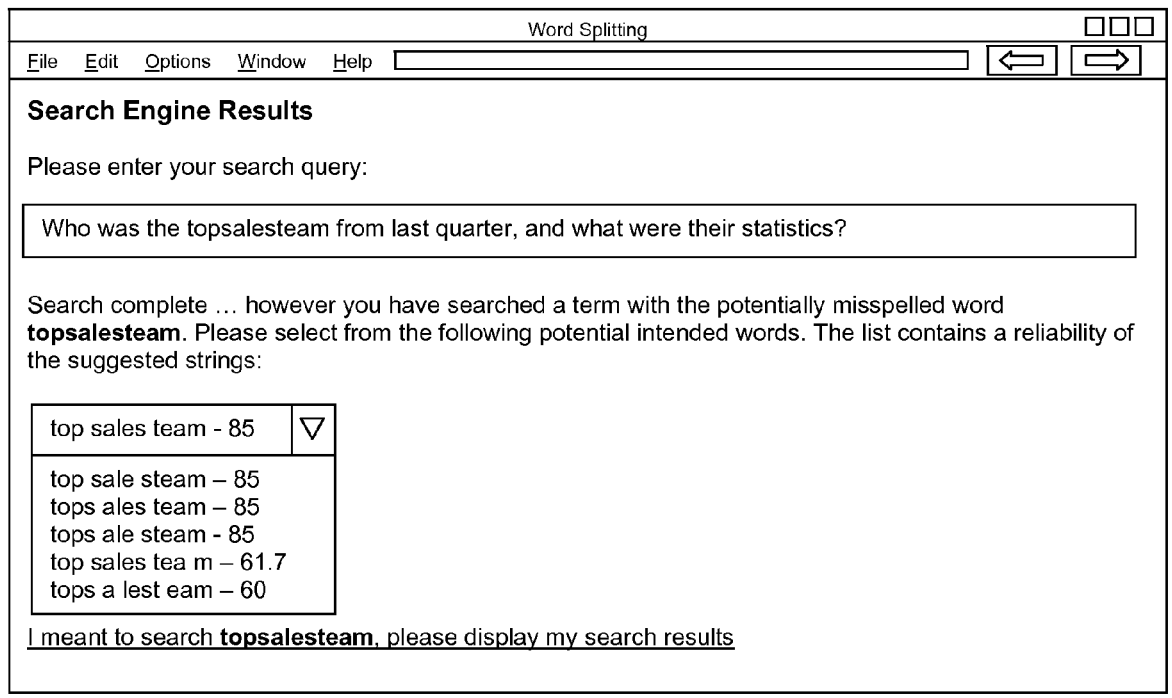
FIG. 22 illustrates a possible embodiment of an interface for calculating and displaying reliability scores in a search engine context.
Figure 23:
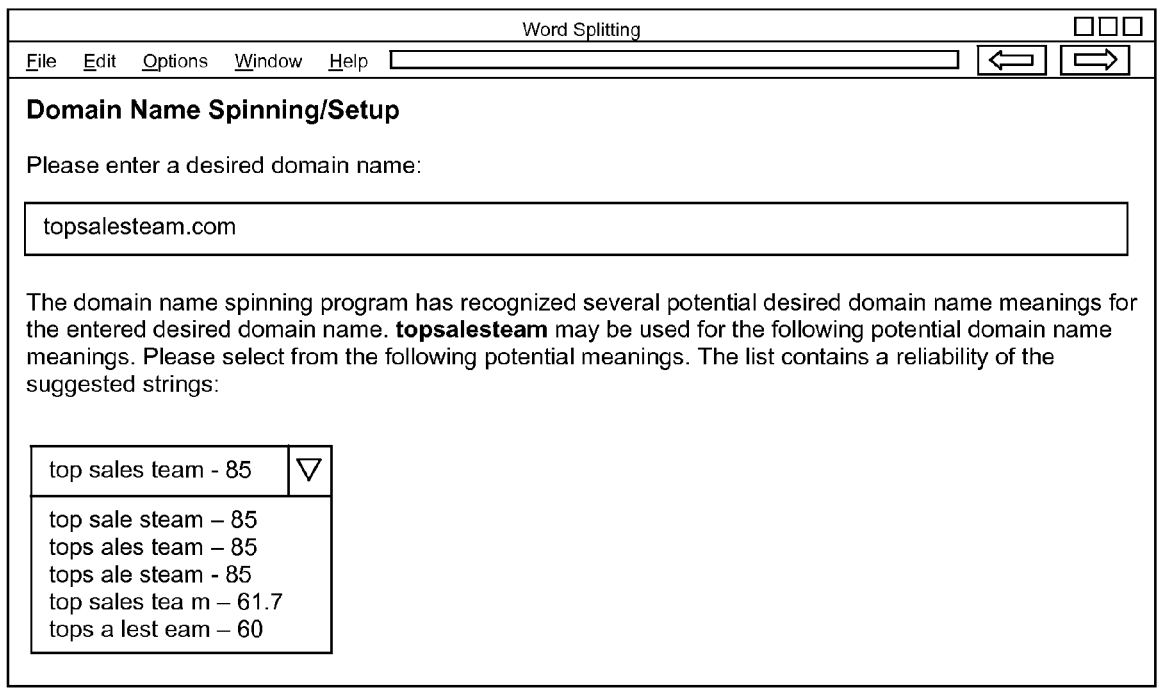
FIG. 23 illustrates a possible embodiment of an interface for calculating and displaying reliability scores in a domain spinning context.

As shown in FIGS. 21-23, the reliability score may be used in the context of a spell check program, a search engine program or a domain setup program. In the non-limiting example embodiment in FIG. 21, a spell check program may recognize a potentially misspelled word "topsalesteam." Using the word splitting and reliability score software modules described herein, the spell check program may recommend various possibilities for the potentially misspelled word, with the most likely of the tied reliability scores, according to the n-gram algorithm, displayed first.

In the non-limiting example embodiment in FIG. 22, a search engine suggestion program may recognize a potentially misspelled word "topsalesteam." Using the word splitting and reliability score software modules described herein, the search engine suggestion program may recommend various possibilities for the potentially misspelled word, with the most likely of the tied reliability scores, according to the n-gram algorithm, displayed first.

In the non-limiting example embodiment in FIG. 23, a domain spinning program may recognize a potential desired domain name "topsalesteam." Such a domain spinning program may be used in the setup of a domain. Using the word splitting and reliability score software modules described herein, the domain spinning program may recommend various possibilities for meanings for the potential domain name, with the most likely of the domain name meanings, according to the n-gram algorithm, displayed first.

The additional steps included in the embodiments illustrated in FIG. 1-8 are not limited to the embodiment shown in FIGS. 1, 7, 9, 20 or their respective illustrated embodiments, and may be combined in several different orders and modified within multiple other disclosed embodiments. Likewise, the method steps disclosed herein may be accomplished by a software module executed on a server and/or client configured to accomplish that method step.

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A method, comprising:
A) storing, by one or more server computers communicatively coupled to a network, an electronic dictionary comprising one or more dictionary words;
B) receiving, by said one or more server computers, a text string without spaces;
C) identifying, by said one or more server computers, a plurality of keywords comprising a plurality of substrings of said text string;
D) generating, by said one or more server computers, from said text string, one or more keyword strings, each comprising a combination of said plurality of keywords;
E) for each of said one or more keyword strings:
  i) identifying by said one or more server computers, within said plurality of keywords, one or more dictionary keywords comprising one or more of said one or more dictionary words;
  ii) calculating, by said one or more server computers, a dictionary keyword percentage variable comprising a quotient dividing a quantity of said one or more dictionary keywords by a quantity of said plurality of keywords;
  iii) calculating, by said one or more server computers, a dictionary keyword percentage weighting variable by determining a quantity of said one or more keyword strings wherein said dictionary keyword percentage variable comprises a value of 100%;
  iv) calculating, by said one or more server computers, a dictionary character percentage variable comprising a quotient dividing a quantity of characters in said one or more dictionary keywords by a quantity of characters in said text string;
  v) calculating, by said one or more server computers, a keyword string rank variable comprising a numerical rank assigned to each of said one or more keyword strings according to a quantity of said plurality of keywords within each of said one or more keyword strings; and
  vi) calculating, by said one or more server computers, a keyword count uniqueness variable calculated by identifying said one or more keyword strings with an equal number of said plurality of keywords; and
F) calculating, by said one or more server computers, for each of said one or more keyword strings, a reliability score comprising a sum of said dictionary keyword percentage variable, said dictionary keyword percentage weighting variable, said dictionary character percentage variable, said keyword string rank variable and said keyword count uniqueness variable.

2. The method of claim 1, wherein said dictionary keyword percentage weighting variable is calculated by:
  i) determining whether said dictionary keyword percentage variable for each of said one or more keyword strings is 100%;
  ii) responsive to a determination that said dictionary keyword percentage variable for at least one of said one or more keyword strings is 100%:
    a) generating, by said one or more server computers, a dictionary keyword quantity comprising a quantity of said at least one of said one or more keyword strings wherein said dictionary keyword percentage variable is 100%; and
    b) generating, by said one or more server computers, said dictionary keyword percentage weighting variable comprising a quotient dividing 1 by said dictionary keyword quantity; and
  iii) responsive to a determination that said dictionary keyword percentage variable for all of said one or more keyword strings is not 100%, generating said dictionary keyword percentage weighting variable comprising a value of 0.

3. The method of claim 1, wherein said keyword string rank variable is calculated by:
  i) calculating, by said one or more server computers, for each of said one or more keyword strings, a keyword quantity comprising a quantity of said plurality of keywords within each of said one or more keyword strings;
  ii) assigning, by said one or more server computers, a rank to each of said one or more keyword strings according to said keyword quantity, a lower keyword quantity having a higher rank than a higher keyword quantity; and
  iii) calculating, by said one or more server computers, said keyword string rank variable comprising a quotient dividing 1 by said numerical rank.

4. The method of claim 1, wherein said keyword count uniqueness variable is calculated by:
  i) calculating, by said one or more server computers, for each of said one or more keyword strings, a keyword quantity comprising a quantity of said plurality of keywords within each of said one or more keyword strings;
  ii) identifying, by said one or more server computers, for each of said one or more keyword strings, a uniqueness quantity comprising a quantity of said one or more keyword strings comprising an equal keyword quantity; and
  iii) calculating, by said one or more server computers, said keyword count uniqueness variable comprising a quotient dividing 1 by said uniqueness quantity.

5. The method of claim 1, wherein:
  i) said dictionary keyword percentage variable is multiplied by a first predetermined multiplicand;
  ii) said keyword string rank variable is multiplied by a second predetermined multiplicand; and
  iii) said sum is divided by a predetermined divisor.

6. The method of claim 1 further comprising the steps of:
  i) determining, by said one or more server computers, whether a plurality of said one or more keyword strings comprise an equal reliability score;
  ii) responsive to a determination that said plurality of said one or more keyword strings comprise an equal reliability score:
    a) determining, by said one or more server computers, a relative usage of each of said plurality of said one or more keyword strings; and
    b) identifying one of said one or more keyword strings comprising a highest relative usage; and
  iii) assigning said one of said one or more keyword strings a reliability score higher than one or more remaining keyword strings.

7. The method of claim 1, wherein said generating step D) further comprises the steps of:
  i) determining, by said one or more server computers, whether a substring within said text string matches any of said one or more dictionary words;
  ii) responsive to a determination that said substring matches any of said one or more dictionary words:
    a) identifying, by said one or more server computers, a substring position comprising a range of character positions of said substring within said text string;
    b) appending, by said one or more server computers, said substring to a keyword array on said one or more sever computers; and
    c) removing, by said one or more server computers, said substring from said text string;
  iii) determining, by said one or more server computers, whether said text string comprises a remaining substring;
  iv) responsive to a determination that said text string comprises said remaining substring, determining, by said one or more server computers, whether said remaining substring matches any of said one or more dictionary words;
  v) responsive to a determination that said remaining substring matches any of said one or more dictionary words, repeating, by said one or more server computers, steps ii) a)-v) for said remaining substring;
  vi) responsive to a determination that said remaining substring does not match any of said one or more dictionary words:
    a) identifying, by said one or more server computers, said substring position for said remaining substring; and
    b) appending, by said one or more server computers, said remaining substring to said keyword array; and
  vii) generating, by said one or more server computers, a keyword string comprising said keyword array ordered and parsed according to said substring position of said substring and said remaining substring.

8. The method of claim 7 further comprising the steps of:
  i) receiving, by said one or more server computers, said text string without spaces;
  ii) setting, by said one or more server computers, a substring length to a number greater than 0;
  iii) identifying, by said one or more server computers, one or more substring-length substrings comprising one or more contiguous substrings with a length of said substring length within said text string;
  iv) for each of said one or more substring-length substrings:
    a) determining, by said one or more server computers, whether one of said one or more substring-length substrings matches any of said one or more dictionary words; and
    b) responsive to a determination that said one of said one or more substring-length substrings matches any of said one or more dictionary words, appending, by said one or more server computers, said substring-length substring to a micro dictionary keyword array;
  v) determining, by said one or more server computers, whether said substring length is greater than a length of said text string;

vi) responsive to a determination that said substring length is not greater than said length of said text string;
   a) incrementing, by said one or more server computers, said substring length by 1; and
   b) repeating, by said one or more server computers, steps iii) - vi) b); and
vii) generating, by said one or more server computers, a micro dictionary comprising one or more keywords comprising said one or more substring-length substrings in said micro dictionary keyword array ordered from a highest substring length to a lowest substring length.

9. The method of claim 8, wherein, for each of said one or more keywords in said micro dictionary:
   i) said substring comprises one of said one or more keywords in said micro dictionary; and
   ii) steps i)-vii) of claim 7 are repeated by said one or more server computers for said one of said one or more keywords.

10. The method of claim 8 wherein said electronic dictionary comprises said micro dictionary.

11. A method, comprising:
   A) storing, by one or more server computers communicatively coupled to a network, an electronic dictionary comprising one or more dictionary words;
   B) receiving, by said one or more server computers, a text string without spaces;
   C) determining, by said one or more server computers, whether a substring within said text string matches any of said one or more dictionary words;
   D) responsive to a determination that said substring matches any of said one or more dictionary words:
      i) identifying, by said one or more server computers, a substring position comprising a range of character positions of said substring within said text string;
      ii) appending, by said one or more server computers, said substring to a keyword array on said one or more sever computers; and
      iii) removing, by said one or more server computers, said substring from said text string;
   E) determining, by said one or more server computers, whether said text string comprises a remaining substring;
   F) responsive to a determination that said text string comprises said remaining substring, determining, by said one or more server computers, whether said remaining substring matches any of said one or more dictionary words;
   G) responsive to a determination that said remaining substring matches any of said one or more dictionary words, repeating, by said one or more server computers, steps i)-iv) for said remaining substring
      i) place the remaining substring in a temporary string;
      ii) identifying, by said one or more server computers, a remaining substring position comprising a range of character positions of said remaining substring within said text string;
      iii) appending, by said one or more server computers, said remaining substring to said keyword array on said one or more sever computers; and
      iv) removing, by said one or more server computers, said remaining substring from said temporary string;
   H) responsive to a determination that said remaining substring does not match any of said one or more dictionary words:
      i) identifying, by said one or more server computers, said remaining substring position for said remaining substring; and
      ii) appending, by said one or more server computers, said remaining substring to said keyword array;
   I) generating, by said one or more server computers, a keyword string comprising said keyword array ordered and parsed according to said substring position of said substring and said remaining substring position of said remaining substring; and
   J) transmitting, by said one or more server computers, said keyword string to a client computer communicatively coupled to said network.

12. The method of claim 11 further comprising the steps of:
   i) receiving, by said one or more server computers, said text string without spaces;
   ii) setting, by said one or more server computers, a substring length to a number greater than 0;
   iii) identifying, by said one or more server computers, one or more substring-length substrings comprising one or more contiguous substrings with a length of said substring length within said text string;
   iv) for each of said one or more substring-length substrings:
      a) determining, by said one or more server computers, whether one of said one or more substring-length substrings matches any of said one or more dictionary words; and
      b) responsive to a determination that said one of said one or more substring-length substrings matches any of said one or more dictionary words, appending, by said one or more server computers, said substring-length substring to a micro dictionary keyword array;
   v) determining, by said one or more server computers, whether said substring length is greater than a length of said text string;
   vi) responsive to a determination that said substring length is not greater than said length of said text string;
      a) incrementing, by said one or more server computers, said substring length by 1; and
      b) repeating, by said one or more server computers, steps iii)-vi) b); and
   vii) generating, by said one or more server computers, a micro dictionary comprising one or more keywords comprising said one or more substring-length substrings in said micro dictionary keyword array ordered from a highest substring length to a lowest substring length.

13. The method of claim 12, wherein, for each of said one or more keywords in said micro dictionary:
   i) said substring comprises one of said one or more keywords in said micro dictionary; and
   ii) steps A)-J) are repeated by said one or more server computers for said one of said one or more keywords.

14. The method of claim 12 wherein said electronic dictionary comprises said micro dictionary.

15. The method of claim 11 wherein said dictionary comprises a dictionary word database.

16. The method of claim 11, further comprising the step of, prior to generating said keyword string, removing, by said one or more server computers, one or more duplicate substrings or duplicate remaining substrings from said keyword string.

17. The method of claim 11, further comprising the step of calculating, by said one or more server computers, for said keyword string, a reliability score comprising a sum of:
   i) a dictionary keyword percentage variable comprising a quotient dividing a quantity of said one or more dictionary words in said keyword string by a quantity of keywords in said keyword string;

ii) a dictionary keyword percentage weighting variable calculated by determining whether said dictionary keyword percentage variable for said keyword string comprises a value of 100%;
iii) a dictionary character percentage variable comprising a quotient dividing a quantity of characters in said one or more dictionary words in said keyword string by a quantity of characters in said text string;
iv) a keyword string rank variable comprising a numerical rank assigned to said keyword string according to a quantity of said keywords within said keyword string; and
v) a keyword count uniqueness variable calculated by identifying said keyword string as sharing an equal number of said quantity of keywords with one or more keyword strings.

18. The method of claim 17, wherein said dictionary keyword percentage weighting variable is calculated by:
i) determining whether said dictionary keyword percentage variable for said one or more keyword strings, including said keyword string, is 100%;
ii) responsive to a determination that said dictionary keyword percentage variable for at least one of said one or more keyword strings is 100%:
   a) generating, by said one or more server computers, a dictionary keyword quantity comprising a quantity of said at least one of said one or more keyword strings wherein said dictionary keyword percentage variable is 100%; and
   b) generating, by said one or more server computers, said dictionary keyword percentage weighting variable comprising a quotient dividing 1 by said dictionary keyword quantity; and
iii) responsive to a determination that said dictionary keyword percentage variable for all of said one or more keyword strings is not 100%, generating said dictionary keyword percentage weighting variable comprising a value of 0.

19. The method of claim 17, wherein said keyword string rank variable is calculated by:
i) calculating, by said one or more server computers, for said one or more keyword strings, including said keyword string, a keyword quantity comprising a quantity of a plurality of keywords within each of said one or more keyword strings;
ii) assigning, by said one or more server computers, a rank to each of said one or more keyword strings according to said keyword quantity, a lower keyword quantity having a higher rank than a higher keyword quantity; and
iii) calculating, by said one or more server computers, for said keyword string, said keyword string rank variable comprising a quotient dividing 1 by said numerical rank.

20. The method of claim 17, wherein said keyword count uniqueness variable is calculated by:
i) calculating, by said one or more server computers, for one or more keyword strings, including said keyword string, a keyword quantity comprising a quantity of a plurality of keywords within each of said one or more keyword strings;
ii) identifying, by said one or more server computers, for each of said one or more keyword strings, a uniqueness quantity comprising a quantity of said one or more keyword strings comprising an equal keyword quantity; and
iii) calculating, by said one or more server computers, for said keyword string, said keyword count uniqueness variable comprising a quotient dividing 1 by said uniqueness quantity.

* * * * *